United States Patent
Grant et al.

(10) Patent No.: US 8,427,286 B2
(45) Date of Patent: Apr. 23, 2013

(54) SYSTEM AND METHOD FOR CONTROLLING HAPTIC DEVICES HAVING MULTIPLE OPERATIONAL MODES

(75) Inventors: Danny A. Grant, Laval (CA); Kollin M. Tierling, Milpitas, CA (US); Juan Manuel Cruz-Hernandez, Montreal (CA); Alex S. Goldenberg, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 446 days.

(21) Appl. No.: 12/818,618

(22) Filed: Jun. 18, 2010

(65) Prior Publication Data
US 2010/0253487 A1  Oct. 7, 2010

Related U.S. Application Data

(63) Continuation of application No. 10/873,643, filed on Jun. 23, 2004, now Pat. No. 7,742,036.

(60) Provisional application No. 60/530,979, filed on Dec. 22, 2003.

(51) Int. Cl.
*G08B 6/00* (2006.01)

(52) U.S. Cl.
USPC ............... 340/407.2; 340/407.1; 345/156

(58) Field of Classification Search ............ 340/407.2, 340/407.1, 4.11, 4.12, 7.6; 310/316, 320, 310/20; 318/568.17; 345/156, 173, 157, 345/158, 161, 204; 710/73; 361/140, 152; 73/579; 331/65, 116 R, 154; 715/702
See application file for complete search history.

(56) References Cited

U.S. PATENT DOCUMENTS

| | | | | | |
|---|---|---|---|---|---|
| 5,619,180 | A | * | 4/1997 | Massimino et al. | 340/407.1 |
| 6,154,198 | A | * | 11/2000 | Rosenberg | 345/161 |
| 2005/0046551 | A1 | * | 3/2005 | Cranfill et al. | 340/407.1 |

FOREIGN PATENT DOCUMENTS

| | | |
|---|---|---|
| JP | 2003-228453 A | 8/2003 |
| JP | 2005-524158 A | 8/2005 |
| WO | 03/091984 A1 | 11/2003 |

* cited by examiner

*Primary Examiner* — Anh V La
(74) *Attorney, Agent, or Firm* — Squire Sanders (US) LLP

(57) ABSTRACT

A haptic device having a plurality of operational modes, including a first operational mode and a second operational mode is provided. The first operational mode is associated with a frequency range. The second operational mode is associated with a frequency range that is different from the frequency range of the first operational mode. A controller is coupled to the haptic device, and is configured to send the haptic device a plurality of control schemes. Each control scheme is uniquely associated with an operational mode from the plurality of operational modes. Another embodiment provides a method that includes providing power to a haptic device configured to cause the haptic device to provide a haptic sensation above a pre-determined sensation threshold. A voltage pulse that is configured to change the haptic sensation output by the haptic device by a pre-determined amount within a pre-determined time period is also applied to the haptic device.

14 Claims, 15 Drawing Sheets

SYSTEM AND METHOD FOR CONTROLLING HAPTIC DEVICES HAVING MULTIPLE OPERATIONAL MODES

PRIORITY

This is a divisional application of U.S. patent application Ser. No. 10/873,643, filed on Jun. 23, 2004, which claims priority of U.S. Provisional Application No. 60/530,979 filed Dec. 22, 2003. The disclosures of the prior applications are hereby incorporated by reference in their entirety.

BACKGROUND

The invention relates generally to haptic feedback devices. More specifically, the invention relates to controlling haptic devices each having multiple operational modes.

Computer users often use interface devices to provide information to computers or other electronic devices. For example, with such interface devices, a user can interact with an environment displayed by a computer to perform functions and tasks on the computer, such as playing a game, experiencing a simulation or virtual reality environment, using a computer aided design system, operating a graphical user interface (GUI), or otherwise affecting processes or images depicted on an output device of the computer. Common human interface devices for computers or electronic devices include, for example, a joystick, button, mouse, trackball, knob, steering wheel, stylus, tablet, pressure-sensitive ball, remote control, wireless phone, and stereo controls.

In some interface devices, feedback, such as force feedback, can also be provided to a user. Each of these interface devices, for example, includes one or more haptic devices, which are connected to a controlling processor and/or computer. Consequently, by a controlling processor, controller, and/or computer, haptic forces produced by the haptic device can be controlled in coordination with actions of the user and/or events associated with an audible environment or a graphical or displayed environment by sending control signals or commands to haptic feedback device.

Multi-mode haptic devices that provide desirable performance have been developed. For example, U.S. application Ser. No. 10/301,809, entitled, "Haptic Feedback Using Rotary Harmonic Moving Mass," the entire disclosure of which is incorporated herein by reference, discloses haptic feedback using a device having a rotary harmonic moving mass. Accordingly, additional systems and methods for controlling multi-mode haptic devices are desirable.

SUMMARY

An embodiment of the invention provides a system and method for controlling multi-mode haptic devices. A haptic device having multiple operational modes, including a first operational mode and a second operational mode is provided. The first operational mode is associated with a frequency range. The second operational mode is associated with a frequency range that is different from the frequency range of the first operational mode. A controller is coupled to the haptic device, and is configured to send the haptic device multiple control schemes. Each control scheme is uniquely associated with an operational mode from the multiple operational modes. According to an embodiment of the invention, the controller is configured to combine each control scheme from the multiple control schemes prior to sending the multiple control schemes to the haptic device.

Another embodiment of the invention provides a method that uses a voltage pulse to reduce the response time of a device. According to this method, steady-state power is provided to a haptic device that is configured to cause the haptic device to output a haptic sensation above a pre-determined sensation threshold. A voltage pulse, which is configured to change the haptic sensation output by the haptic device by a pre-determined amount within a pre-determined, reduced response time, is applied to the haptic device. According to an embodiment of the invention, the voltage pulse is applied to the haptic device prior to providing the steady-state power to the haptic device. According to another embodiment, the voltage pulse is applied to the haptic device after terminating the steady-state power provided to the haptic device. The voltage pulse can be applied to a single-mode haptic device or a multi-mode haptic device. According to one or more embodiments of the invention, use of such a voltage pulse can improve response time of a haptic device to which the pulse is applied (e.g., for stopping or starting haptic effects, etc.).

DETAILED DESCRIPTION

Figure 1:
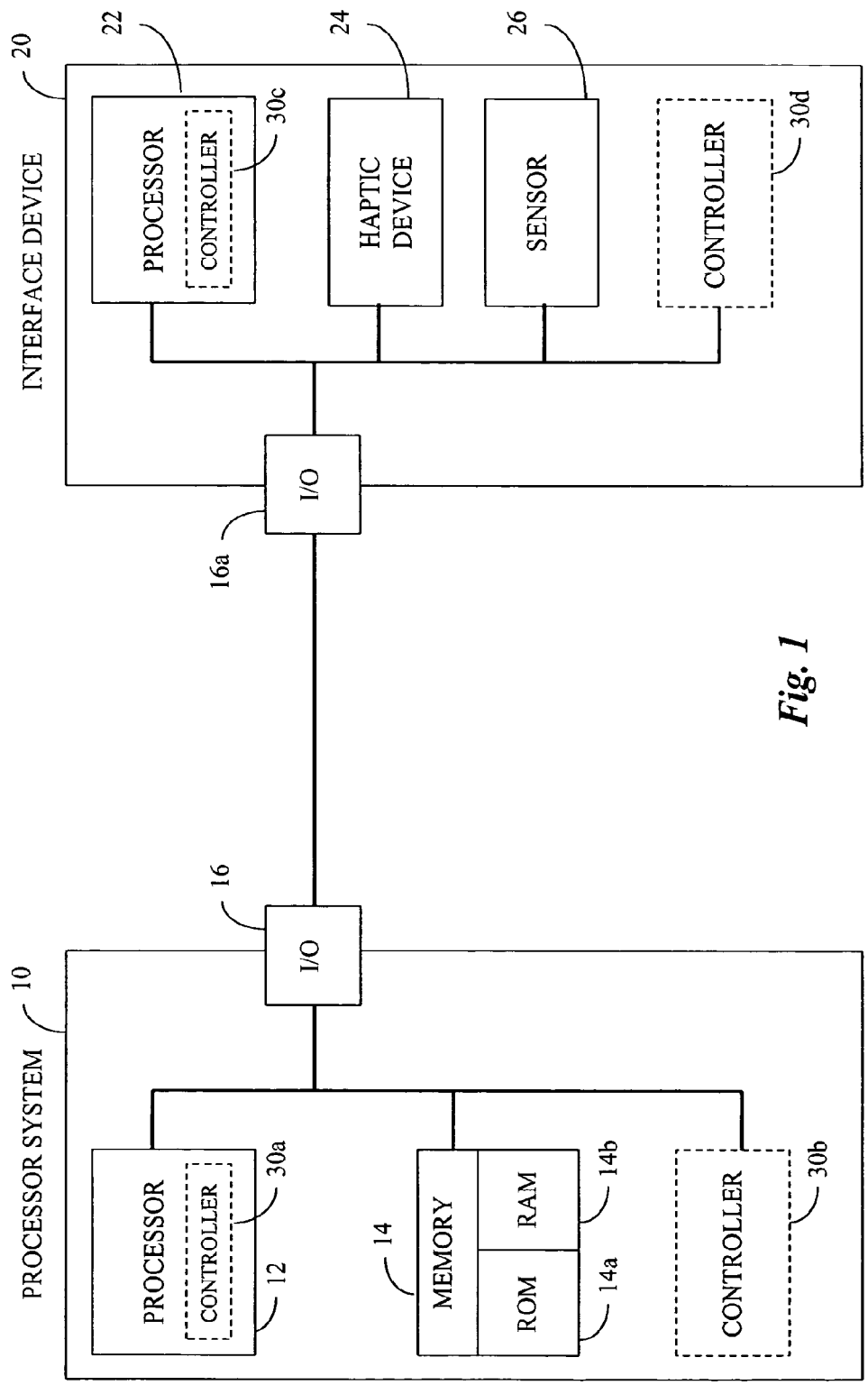
FIG. 1 is a block diagram of a system including a processor system and an interface device, according to an embodiment of the invention.

Systems and methods for controlling multi-mode haptic devices are described. More specifically, an embodiment of the invention is described in the context of a haptic device that has a multiple operational modes, each of which is associated with a frequency range. A controller is coupled to the haptic device and is configured to send the haptic device multiple control schemes associated with the multiple operational modes.

Feedback provided via a haptic device is sometimes referred to as vibrotactile feedback or kinesthetic feedback, and is referred to more generally herein as "haptic feedback." Such haptic feedback can be provided, for example, by way of a haptic device or an interface device including a haptic device. Interface devices that provide haptic feedback can provide physical sensations that can be measured by some metric (e.g., perceivable frequency content), and can be felt by a user using a controller or manipulating a physical object of the interface device.

According to an embodiment of the invention, a haptic device has multiple operational modes. A first operational mode is associated, for example, with a high-frequency range, and a second operational mode is associated, for example, with a low-frequency range control scheme associated with each of the operational modes can be sent to the haptic device; each of the control schemes can cause the haptic device to provide a particular haptic feedback. The control scheme associated with each frequency range can be combined (e.g., superimposed, added, multiplied, convolved, combined by a non-vectored operation, etc.) with one or more remaining control schemes, or otherwise operated on, according to pre-determined rules to provide a transitional response between the frequency ranges. In this manner, an embodiment of the invention provides for a "blending" or "transitioning" of haptic feedback from a low-frequency range to a high-frequency range such that the performance over and between the low- and high-frequency ranges is relatively seamless.

According to another embodiment of the invention, a haptic device having multiple operational modes is provided. The multiple operational modes of the haptic device include, for example, a low-frequency operational mode, a high-frequency operational mode, and a transitional operational mode, which is associated with frequencies between low frequencies associated with the low-frequency mode and high frequencies associated with the high-frequency mode. The low-frequency operational mode is sometimes referred to herein as "unidirectional" (e.g., unidirectional spinning of a rotational device), and the high-frequency operational mode is sometimes referred to herein as "harmonic" or "oscillating." The transitional operational mode is associated with a transitional frequency range that combines a superposed response of the unidirectional mode and the harmonic mode. The low-frequency operational mode is associated with, for example, frequencies up to approximately 10 Hz, and the high-frequency operational mode is associated with frequencies, for example, above approximately 10 Hz. A transitional frequency range associated with the transitional operational mode includes, for example, frequencies from about 5 Hz to about 25 Hz, where the low-frequency and high-frequency operational modes are associated with frequencies below and above the transitional frequency range, respectively.

FIG. 1 is a block diagram of a system having a processor system 10 and an interface device, according to an embodiment of the invention. The system illustrated in FIG. 1 includes a processor system 10 in communication with an interface device 20. The processor system 10 can be, for example, a commercially available personal computer or a less complex computing or processing device that is dedicated to performing one or more specific tasks. For example, the processor system 10 can be a terminal dedicated to providing an interactive virtual reality environment, such as a gaming system, or the like.

The processor system 10 includes a processor 12, which according to one or more embodiments of the invention, can be a commercially available microprocessor. Alternatively, the processor 12 can be an application-specific integrated circuit (ASIC) or a combination of ASICs, which is designed to achieve one or more specific functions, or enable one or more specific devices or applications. In yet another alternative, the processor 112 can be an analog or digital circuit, or a combination of multiple circuits.

Alternatively, the processor 12 can optionally include one or more individual sub-processors or coprocessors. For example, the processor can include a graphics coprocessor that is capable of rendering graphics, a controller that is capable of controlling one or more devices, a sensor that is capable of receiving sensory input from one or more sensing devices, and so forth.

The processor system 10 also includes a memory component 14. As shown in FIG. 1, the memory component 14 can include one or more types of memory. For example, the memory component 14 can include a read only memory (ROM) component 14A and a random access memory (RAM) component 14B. The memory component 14 can also include other types of memory not illustrated in FIG. 1 that are suitable for storing data in a form retrievable by the processor 12. For example, electronically programmable read only memory (EPROM), erasable electrically programmable read only memory (EEPROM), flash memory, as well as other suitable forms of memory can be included within the memory component 14. The processor system 10 can also include a variety of other components, depending upon the desired functionality of the processor system 10.

The processor 12 is in communication with the memory component 14, and can store data in the memory component 14 or retrieve data previously stored in the memory component 14. The components of the processor system 10 can communicate with devices external to the processor system 10 by way of an input/output (I/O) component 16. According one or more embodiments of the invention, the I/O component 16 can include a variety of suitable communication interfaces. For example, the I/O component 16 can include, for example, wired connections, such as standard serial ports, parallel ports, universal serial bus (USB) ports, S-video ports, large area network (LAN) ports, small computer system interface (SCSI) ports, audio ports, and so forth. Additionally, the I/O component 16 can include, for example, wireless connections, such as infrared ports, optical ports, Bluetooth wireless ports, wireless LAN ports, or the like.

By way of the I/O component 16, the processor system 10 can communicate with other devices, such as interface devices 20. These interface devices 20 can be configured to provide haptic feedback. Each interface device 20 can communicate with the processor system 10 by way of an I/O component 16a, which is similar to the I/O component 16 of the processor system 10 and can include any of the wired or wireless communications ports described above in connection with that I/O component 16. Thus, the communications link between the I/O component 16 of the processor system 10 and the I/O component 16a of the interface device 20 can take a variety of forms, including, for example, wired communications links, wireless communications links (e.g., RF links), optical communications links, or other suitable links.

The interface device 20 includes a number of components, such as a processor 22, a haptic device 24, and a sensor 26. As with the components of the processor system 10, the interface device 20 can include additional components. For example, the interface device can include additional duplicates of the components shown in FIG. 1 (e.g., the interface device 20 can include multiple processors 22, haptic devices 24, sensors 26 and/or controllers 30, etc.). Additionally, the interface device 20 can include other components not shown in the figure. For example, where it is desirable to store data received by the interface device 20 via I/O component 16a, a suitable memory component or buffer memory component can be used. The interface can also include power-sourcing circuitry, an example of which can be seen in U.S. Pat. No. 5,929,607, entitled, "Low Cost Force Feedback Interface with Efficient Power Sourcing," the disclosure of which is incorporated by reference herein in its entirety.

The processor 22 of the interface device 20, can be similar to the processor 12 of the processor system 10, described above, or can be specifically designed (e.g., an ASIC) and/or programmed for the functionality of the interface device 20. As with the processor 12 of the processor system 10, the processor 22 of the interface device 20, can include a variety of sub-processors, which can, for example, be used in parallel.

As discussed above, the interface device 20 includes a haptic device 24, which is used to provide tactile or haptic feedback to a user of the interface device 20. According to an embodiment of the invention, haptic feedback can be provided by way of a physical object, such as a housing, a manipulandum, or the like. The haptic device 24 can take a variety of forms, including one or more haptic devices that each have multiple operational modes associated with multiple corresponding frequency ranges. Some examples of haptic device 24 configurations that can be used in accordance with one or more embodiments of the invention will be described in greater detail below. The examples of haptic devices 24 given below, however, are not intended to form an exhaustive list of all types of haptic devices 24 that can be included in the interface device 20 but are intended instead as examples only.

The sensor 26 of the interface device 20 is configured to sense input from a user of the interface device 20. For example, the sensor 26 can be used to sense manipulation or movement of a physical object, such as a manipulandum, of the interface device 20. The sensor 26 can also be used to sense other forms of user input, such as pressure, speed, acceleration, torque, light, or other measurable quantities. For example, the sensor 26 can incorporate a piezoelectric sensor to sense pressure, an inertial measurement unit (IMU), such as an accelerometer, to sense various forms of motion, a photovoltaic sensor to sense changes in light levels, and/or other sensors. The sensor 26 can also sense other input, such as feedback (e.g., state information including position and/or velocity) from the haptic device 24, for example.

As shown in FIG. 1, the various components of the interface device 20 are in communication with one another and with the components of the processor system 10 (via the I/O components 16, 16A). The processor 22 of the interface device 20, for example, can be used to control the haptic device 24 based on information received from the sensor 26. Similarly, the processor 12 of the processor system 10 can be used to control the haptic device 24 of the interface device 20 based on information received from the sensor 26 of the interface device 20; in such an embodiment, the processor 22 need not be present. Alternatively, the processor 12 of the processor system 10 (also referred to as a "host processor") can be used in concert with the processor 22 of the interface device 20 (also referred to as a "local processor") both to interpret data received from the sensor 26 and to control the haptic device 24.

The processor system 10 and the interface device 20 can optionally make use of one or more controllers 30a, 30b, 30c, 30d (which can be referred to hereinafter as a controller 30, collectively, individually, or as a subset). As shown in FIG. 1, a controller 30 can exist within the processor 12 (e.g., in the form of a control algorithm) of the processor system 10 and/or the processor 22 of the interface device 20. Additionally, a controller 30 can be a separate component connected to the other components of the processor system 10 and/or the interface device 20 via a bus or other suitable connection. It should be recognized that, according to one or more embodiments, the interface device 20 can function independently of the processor system 10, as it has its own processor and/or controller 30c, 30d, and may not require a processor system 10 at all. For example, the interface device 20 can be a stand-alone device such as a personal digital assistant (PDA) or a cellular telephone, which may or may not be configured to connect to a processor system 10.

Figure 2A:
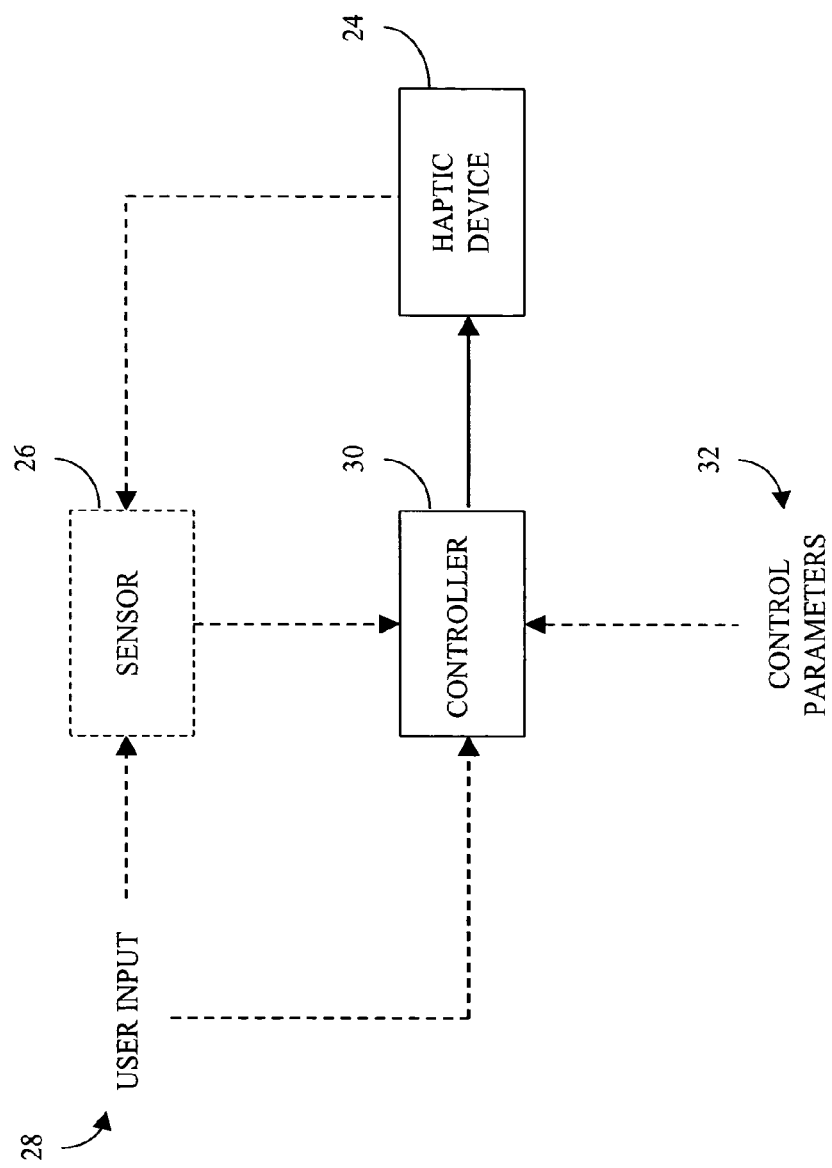
FIG. 2A is a diagram illustrating a haptic device, a controller, and a sensor, according to an embodiment of the invention.

FIG. 2A is a diagram illustrating a haptic device, a controller, and a sensor, according to an embodiment of the invention. FIG. 2A also shows different data values provided to the system. The elements shown in FIG. 2A can be used with the processor system 10 and the interface device 20, or with the interface device 20 alone.

As shown in FIG. 2A, user input 28 can optionally be provided (e.g., via the user interface device 20 shown in FIG. 1), and received by an optional sensor 26. The user input 28 can also optionally be provided directly to a controller 30 (e.g., by way of the sensor 26, or some other devices configured to accept and convey user input). The sensor 26 can also optionally receive information from the haptic device 24. For example, the sensor 26 can sense the actual movements of the haptic device 24, thereby sensing the tactile or haptic feedback output by the haptic device 24.

According to an arrangement of the system shown in FIG. 2A, the controller 30 can optionally receive data from the sensor 26, and can optionally receive user input 28 and control parameters 32. Based on the any data received from the sensor 26, any received user input 28, and/or any received control parameters 32, the controller 30 controls the tactile output or haptic feedback of the haptic device 24. For example, the controller 30 (or control algorithm when so implemented) can be used to implement a feedback algorithm, controlling the haptic device 24 based on feedback received from the haptic device 24. The controller controls the output of the haptic device 24 by a control signal that the controller 30 outputs to the haptic device 24.

The control signal output by the controller 30 can be based on a number of parameters, including, for example, control parameters 32. For example, control parameters 32 and other parameters that are used by the controller 30 to control the haptic device 24 can be stored in the memory component 14 of the processor system 10, or by another suitable memory component (e.g., a memory component of the interface device 20). According to one or more embodiments of the invention, the control parameters 32 can include input from a portable electronic device and/or a gaming system. For example, the control parameters 32 can include input from a gaming system, a portable gaming device, a cellular telephone, or the like. According to one or more embodiments of the invention, the controller 30 receives control parameters 32 (e.g., gaming device input, cellular telephone input, etc.), and does not include a sensor 26. According to such embodiments, user input 28 can optionally be received directly by the controller 30, or can be omitted entirely, depending upon the desired function of the system in which the controller 30 is used.

According to one or more embodiments of the invention, the system shown in FIG. 2A can be used in a stand-alone device, such as a cellular telephone, portable electronic device (e.g., a PDA, etc.), or other device. In a cellular telephone embodiment, for example, feedback can be provided in the form of haptic sensations via the haptic device 24 in response to status events (e.g., a message received signal, a network indicator signal, etc.), user input (e.g., mode changes, keypad dialing, option selections, etc.), incoming calls, or other events. Alternatively, the system shown in FIG. 2A can be used in a configuration, such as the configuration shown in FIG. 1, where an interface device 20 can be connected to a processor system 10.

Figure 2B:
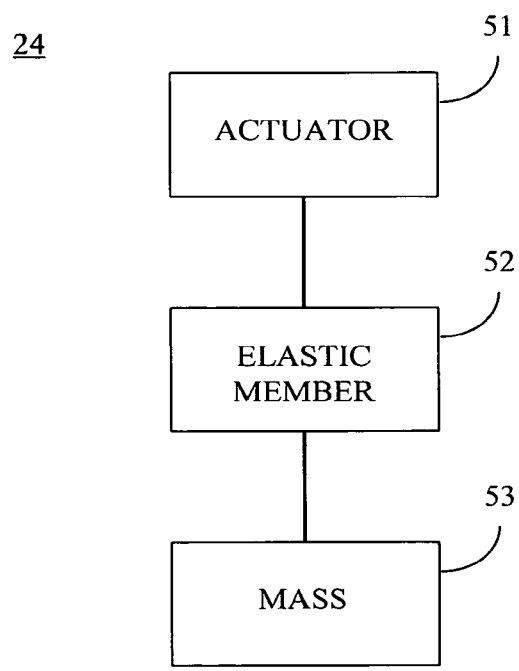
FIG. 2B is a block diagram of a haptic device, according to an embodiment of the invention.

FIG. 2B is a block diagram of a haptic device 24 shown in FIGS. 1 and 2A. As shown in FIG. 2B, the haptic device 24 includes an actuator 51, an elastic member 52 and a mass 53. The haptic device 24 is configured to provide haptic feedback. The actuator 51 is operably connected to the elastic member 52, and the elastic member 52 is operably connected to the mass 53. In operation, the actuator provides force to the elastic member 52. Some of the force applied to the elastic member 52 is translated to the mass 53, and causes the mass 53 to move. By causing the mass 53 to move, haptic forces are provided to a user. Note that the configuration shown in FIG. 2B is only one example of a configuration of a haptic device 24. Other configurations that vary from the configuration shown in FIG. 2B can be used as the haptic device 24. For example, the elastic member 52 can be coupled to the mass 53 by a flexible coupling; the elastic member 52 can be coupled to the actuator 51 by a flexible coupling. In alternative embodiment, the elastic member can be coupled between actuator and a mechanical ground, and the actuator can be directed coupled to the actuator.

Figure 3A:
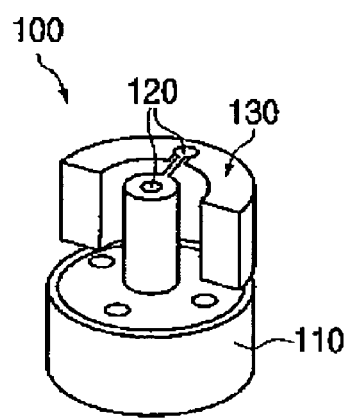
FIG. 3A is a perspective view of a haptic device, according to an embodiment of the invention.
Figure 3B:
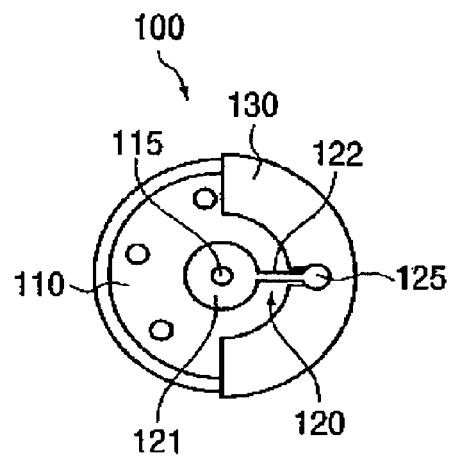
FIG. 3B is a cross-sectional view of the haptic device shown in FIG. 3A.

FIG. 3A is a perspective view of a haptic device, according to an embodiment of the invention, and FIG. 3B is a cross-sectional view of the haptic device shown in FIG. 3A. As shown in FIGS. 3A and 3B, the haptic device 100 includes an actuator 110, an elastic member 120 and a mass 130. The haptic device 100 is configured to provide haptic feedback. As with the haptic devices described below, the haptic device 100 shown in FIGS. 3A and 3B can be used as the haptic device 24 shown in FIGS. 1 and 2 within an interface device 20.

The actuator 110 of the haptic device 100 is a rotary actuator and includes a shaft 115. The elastic member 120 includes a proximate portion 121, a compliant portion 122 and a distal portion 125. The proximate portion 121 of the elastic member 120 is coupled to the shaft 115 of the actuator 110. The distal portion 125, which has a width greater than the compliant portion 122, is coupled to the mass 130.

The actuator 110 can be any type of rotary actuator such as, for example, a direct current (DC) motor, voice coil actuator or a moving magnet actuator. In addition, actuator 110 can be disposed in and mechanically grounded to a device housing (not shown), such as the interface device 20 described above (e.g., a game controller housing, etc.). Examples of haptic devices disposed in and mechanically grounded to game controller housings are disclosed in U.S. application Ser. No. 09/967,494, filed on Sep. 27, 2001, entitled, "Actuator for Providing Tactile Sensations and Device for Directional Tactile Sensations," and Ser. No. 09/968,725, filed on Sep. 28, 2001, entitled, "Directional Inertial Tactile Feedback Using Rotating Masses," the disclosures of which are incorporated herein by reference.

Although the elastic member 120 is shown as being integrally formed in a unitary construction among the proximate portion 121, compliant portion 122 and distal portion 125, other configurations are possible. Where the compliant portion 122 is made of a flexible material, the proximate portion and the distal portion 125 need not be made of flexible materials and need not be integrally formed with the compliant portion 122. For example, the compliant portion 122 of an elastic member can be coupled to the mass 130 and/or the shaft 115 of the actuator 110 by separate couplings or fasteners. Similarly, the elastic member 120 can be of various types including, for example, leaf springs, helical springs, and so forth.

The actuator 110, the elastic member 120 and the mass 130 of the haptic device 100 collectively have a first operational mode associated with a range of frequencies and a second operational mode associated with a range of frequencies different from the range of frequencies associated with the first operational mode. For example, the first operational mode can be based on a unidirectional rotation of the mass 130 about the shaft 115 of the actuator 110 (also referred to herein as the "unidirectional mode"); the second mode can be based on a harmonic motion of the mass 130 (also referred to herein as the "harmonic mode"). The range of frequencies associated with the first operational mode can, optionally, overlap with the range of frequencies associated with the second operational mode.

More specifically, the elastic member 120 coupled between the shaft 115 of the actuator 110 and the mass 130 results in a harmonic system. Such a harmonic system exhibits second order behavior with the magnification of vibrations at certain frequencies (e.g., at a resonance frequency of the mechanical system). Here, the haptic device 100 is configured as a harmonic system where the elastic member 120 stores energy and releases it while in the harmonic mode. For example, the compliant portion 122 of the elastic member 120 can store energy during the movement of the mass 130 in response to one polarity of an alternating current (AC) drive signal and can release the energy during the movement of the mass 130 in response to the other polarity of the AC drive signal. This results in harmonic motion and corresponding amplification through broad resonance, which results in high magnitude vibrations and other effects in a power-efficient manner. In addition, complex AC drive signals having many different frequency components can be combined (e.g., superimposed, combined by a vectored or non-vectored operation, etc.) on each other while the haptic device 100 operates in the harmonic mode. The controller 30 described above in connection with FIG. 2A provides these complex AC drive signals.

The inventors have recognized that it is advantageous for the damping factor of the mechanical system to be low. This may result in a more efficient harmonic vibration. Consequently, the compliant portion 122 of the elastic member 120 can be made of polypropylene, which exhibits a low damping. Alternatively, the elastic member can be made of steel, wire, plastic or other similar types of materials that can connect the mass 130 in series with the shaft 115 of the actuator 110.

When operating in the unidirectional mode, the actuator 110 can be driven, for example, with a DC current, thereby causing the mass 130 to rotate about the shaft 115 of the actuator 110 with centripetal acceleration. This centripetal acceleration provides strong inertial forces against the device housing. Firmware or software techniques can be used to control the magnitude of the vibrations while operating in the unidirectional mode. For example, a certain pulse-repetition rate having a 50% duty cycle results in mass 130 rotating unidirectionally at a certain rate with approximately half of the vibration magnitude that would otherwise result from applying a constant voltage (i.e., 100% duty cycle). Although the relationship between the duty cycle and the vibration magnitude may not be linear, it can be approximated as linear over certain operational ranges for the sake of convenience. Further examples of such firmware are disclosed in U.S. application Ser. No. 09/669,029, filed on Sep. 27, 2000, entitled, "Controlling Haptic Sensations for Vibrotactile Feedback," the disclosure of which is incorporated herein by reference.

When the actuator 110 is operated in the harmonic mode, the mass 130 oscillates at or approximately at the frequency of the drive signal (e.g., an AC signal driving the actuator 110). Such a drive signal can be produced, for example, by an H-bridge circuit or other amplifier. An example of an H-bridge amplifier that can be used to produce such a drive signal is disclosed in U.S. application Ser. No. 10/000,662, filed on Oct. 31, 2001, now U.S. Pat. No. 6,683,437, entitled, "Current Controlled Motor Amplifier System," the disclosure of which is incorporated herein. Using such a signal advantageously involves smaller time delays in starting and stopping movement of the mass 130 and in achieving peak or maximum acceleration than is the case with motion of the mass in the unidirectional mode. Additionally, other techniques may be employed to reduce time delays associated with starting and stopping movement of the mass 130, as will be described below in greater detail, such as providing a lead-in or ending current pulse as part of a control signal, for example.

Figure 4A:
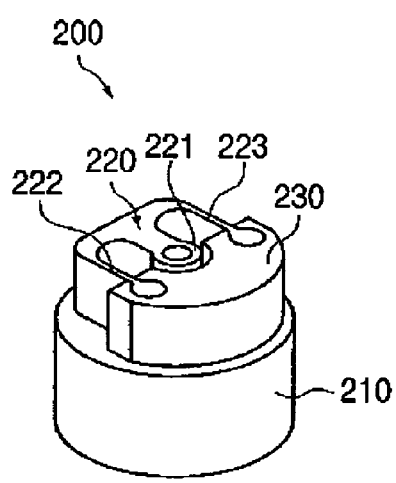
FIG. 4A is a perspective view of a haptic device, according to an embodiment of the invention.
Figure 4B:
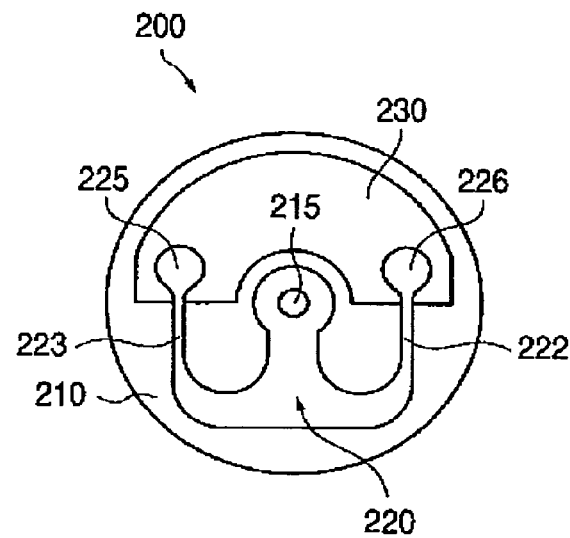
FIG. 4B is a cross-sectional view of the haptic device shown in FIG. 4A.

FIG. 4A is a perspective view of a haptic device, according to another embodiment of the invention, and FIG. 4B is a cross-sectional view of the haptic device shown in FIG. 4A. Unlike FIGS. 3A and 3B, which show an elastic member having a single compliant portion, alternative embodiments having an elastic member with multiple compliant portions are possible, such as the haptic device 200 shown in FIGS. 4A and 4B, which has two compliant portions. This haptic device 200 can be used as the haptic device 24 of the interface device 20 shown in FIG. 1. The haptic device 200 includes an actuator 210, an elastic member 220, and a mass 230. The actuator 210, which is a rotary actuator, includes a shaft 215. The elastic member 220 includes a proximate portion 221, multiple compliant portions 222, 223, and multiple corresponding distal portions 225, 226. The proximate portion 221 of the elastic member 220 is coupled to the shaft 215 of the actuator 210. The distal portions 225, 226 each have a width greater than their respective compliant portions 222, 223 and are coupled to the mass 230. Although the elastic member 220 shown in FIGS. 4A and 4B has two compliant portions 222, 223, other embodiments are possible where the elastic member has more than two compliant portions.

Note that the compliant portion(s) of a rotating mass can be compliant in one degree of freedom or axis of travel of the mass, but need not be compliant in the remaining degrees of freedom. For example, the compliant portion 122 shown in FIGS. 3A and 3B can be inflexible in the direction parallel to the axis of rotation along the shaft 115 of the actuator 110. Similarly, the compliant portions 222, 223 shown in FIGS. 4A and 4B can each be inflexible in the direction parallel to the axis of rotation along the shaft 215 of the actuator 210. As best shown in 4A, the compliant portions 222, 223 can be relatively thick along the direction parallel to the shaft 215 of the actuator 210. Additionally, the elasticity of the various compliant portions can be varied according to torsional or other characteristics.

Figure 5:
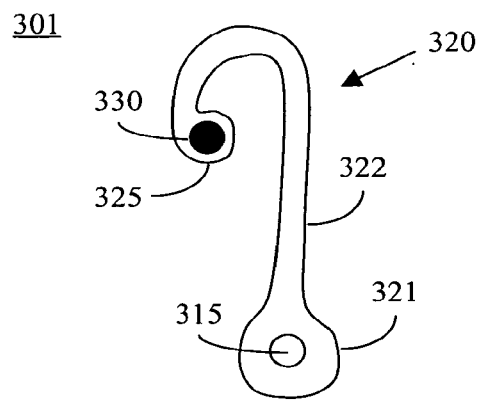
FIG. 5 shows a top view of a portion of a haptic device, according to an embodiment of the invention.
Figure 6:
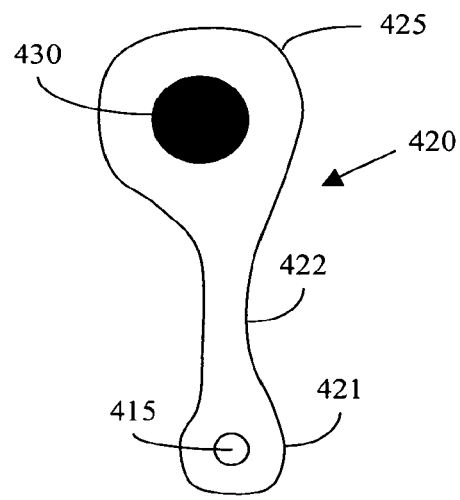
FIG. 6 shows a top view of a portion of a haptic device, according to an embodiment of the invention.
Figure 7:
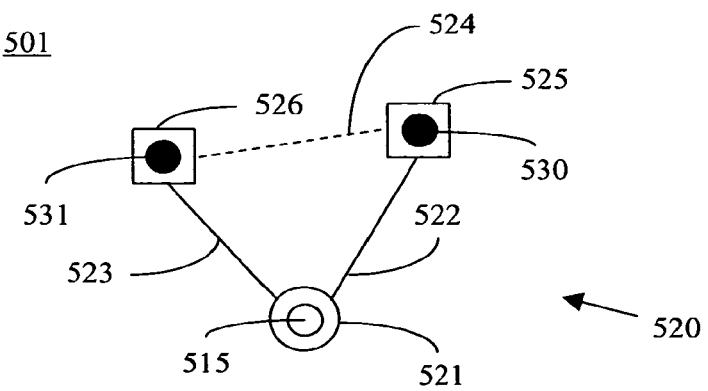
FIG. 7 shows a top view of a portion of a haptic device, according to an embodiment of the invention.

FIGS. 5-7 each show a top view of a portion of a haptic device in accordance with other embodiments of the invention. When in operation, the mass(es) for each haptic device rotate(s) about the shaft of the actuator. Each of the portions of haptic devices shown in these figures can be used either in a unidirectional mode, a harmonic mode, or a superposition mode that combines the unidirectional mode and the harmonic mode. Thus, each portion of a haptic device shown in FIGS. 5-7 has multiple operational modes that can be controlled by way of one or more embodiments of the invention. Each portion of a haptic device shown in FIGS. 5-7 can also be used as part of the haptic device 24 of FIG. 1.

FIG. 5 shows top view of a portion of a haptic device, according to an embodiment of the invention. The portion 301 of a haptic device in FIG. 5 includes an elastic member 320, which is similar to the elastic members 120, 220, described above. The elastic member 320 includes a proximate portion 321, a compliant portion 322, and a distal portion 325. The proximate portion 321 is coupled to the shaft 315 of an actuator (not shown). The distal portion 325 is coupled to a mass 330. It will be appreciated that the mass 330, although shown as being integrally encapsulated within the distal portion 325, can also be external to the distal portion 325, according to one or more embodiments of the invention.

The elastic member 320 shown in FIG. 5 can be used in a unidirectional operational mode (e.g., by applying a DC or other low-frequency drive signal), or in a harmonic operational mode (e.g., by applying an AC drive signal). Additionally, because the elastic member 320 is asymmetric, it exhibits different characteristics depending on which direction it is rotated. Thus, in addition to potentially exhibiting one of multiple operational modes depending upon the drive signal, different operational modes can be achieved by rotating the elastic member 320 in a different direction. Moreover, portion 301 of the haptic device shown in FIG. 5 can provide advantageously a variable moment, which substantially decouples the amplitude and the frequency of haptic sensations produced thereby. More specifically, as the velocity with which the portion 301 is rotated increases, the compliant portion 322 flexes, and the radial distance between the mass 330 and the center of rotation (e.g., the shaft 315) varies. For example, according to an embodiment, the mass 330 moves closer to the shaft 315 as the rotation velocity of the portion 301 increases, thereby changing the moment of the portion 301.

FIG. 6 shows a top view of a portion of a haptic device, according to another embodiment of the invention. The portion 401 of the haptic device in FIG. 6 includes an elastic member 420, which is similar to the elastic members 120, 220, 320, described above. The elastic member 420 includes a proximate portion 421, a compliant portion 422, and a distal portion 425. The proximate portion 421 is coupled to the shaft 415 of an actuator (not shown). The distal portion 425 is coupled to a mass 430. It will be appreciated that the mass 430, although shown as being integrally encapsulated within the distal portion 425, can also be external to the distal portion 425, according to one or more embodiments of the invention.

The elastic member 420 shown in FIG. 6 can be used in a unidirectional operational mode (e.g., by applying a DC or other low-frequency drive signal), or in a harmonic operational mode (e.g., by applying an AC drive signal). Additionally, as with the elastic member 320 shown in FIG. 5, the elastic member 420 of FIG. 6 is asymmetric, and therefore, exhibits different characteristics depending on which direction it is rotated. Thus, in addition to potentially exhibiting one of multiple operational modes depending upon the drive signal, different operational modes can be achieved by rotating the elastic member 420 in a different direction.

FIG. 7 shows a top view of a portion of a haptic device, according to an embodiment of the invention. The portion 501 of a haptic device in FIG. 7 includes an elastic member 520, which is similar to the elastic members 120, 220, 320, 420, described above. The elastic member 520 includes a proximate portion 521, two compliant portions 522, 523, and two distal portions 525, 526. The proximate portion 521 is coupled to the shaft 515 of an actuator (not shown). The distal portions 525, 526 are coupled to two masses 530, 532, respectively. It will be appreciated that the masses 530, 531, although shown as being integrally contained within the distal portions 525, 526, can also be external to the distal portions 525, 526, according to one or more embodiments of the invention.

The elastic member 520 shown in FIG. 7 can be used in a unidirectional operational mode (e.g., by applying a DC or other low-frequency drive signal), in a harmonic operational mode (e.g., by applying an AC drive signal) or an operation mode being the superposition of the unidirectional mode and the harmonic mode. Additionally, because the elastic member 520 is asymmetric, it exhibits different characteristics depending on which direction it is rotated. This asymmetry of the elastic member 520 can be further accentuated by using differently weighted masses 530, 531. Thus, in addition to potentially exhibiting one of multiple operational modes depending upon the drive signal, different operational modes can be achieved by rotating the elastic member 520 in a different direction.

The portion 501 of the haptic device can also provide a variable moment, which decouples the magnitude and frequency of haptic sensations provided thereby. More specifically, the compliant portions 522, 523 can be formed in such a way to allow the distance between the masses 530, 531 to vary as the rotational velocity and/or the direction of rotation of the portion 501 is varied. For example, according to one embodiment of the invention, a compliant member 524 (e.g., a spring) can optionally be connected between the two distal portions 525, 526. This additional compliant member 524 (shown in FIG. 7 by a dashed line) can cause the distal portions 525, 526 (and the corresponding masses 530, 531) to move closer together when the portion 501 is rotated in one direction, causing the portion 501 to exhibit a low-frequency eccentric-mass response. When the portion 501 is rotated in the opposite direction, however, the distal portions 525, 526 (and the corresponding masses 530, 531) move farther apart, causing the portion 501 to exhibit a higher-frequency eccentric-mass response. These two eccentric-mass responses can be used in addition to the unidirectional or harmonic modes described above to control haptic sensations provided by way of a haptic device. Thus, for example, the portion 501 can produce a multi-modal response as well as a variable-moment response.

According to one or more embodiments of the invention, the compliant portions 522, 523 of the elastic member 520 are different lengths and/or made from different materials. For example, materials having different flexibilities or spring constants can be used to form each of the compliant portions 522, 523. Additionally, each of the compliant portions 522, 523 can be formed to have different harmonic responses. For example, each of the compliant portions 522, 523 can exhibit harmonic responses to different resonant frequencies or frequency ranges. Additionally, each of the compliant portions 522, 523 can exhibit different responses in each direction or angle of rotation. Thus, depending upon the specific construction of the elastic member 520, several harmonic responses and/or several operational modes of the elastic member 520 can be obtained.

According to an embodiment of the invention, a haptic device, such as the haptic device 24 shown in FIG. 1, for example, includes a variable-stiffness compliant portion of a compliant member. If the spring constant (K) value of a compliant portion of an elastic member can be varied as a function of drive frequency, then the haptic device can operate near a peak magnitude and efficiency across a relatively wide range of frequencies. A mechanical actuator can be, for example, a piezoelectric structure (e.g., a piezoelectric buzzer). Such a piezoelectric structure can include, for example, a ceramic on a mass where an applied voltage causes movement of the ceramic. Through proper selection of the applied voltage, the ceramic can behave in a manner similar to a spring. The piezoelectric structure can change its spring constant as a function of bias voltage. Consequently, a frequency-to-voltage converter driving the piezoelectric structure can maintain a resonance frequency of haptic device by adjusting the spring constant.

The behavior of an embodiment of the haptic device having a unidirectional mode and a harmonic mode (e.g., the haptic device 100 shown in FIGS. 3A and 3B, the haptic device 200 shown in FIGS. 4A and 4B, and haptic devices using the rotating masses shown in FIGS. 5-7) can be modeled. Such a model can be based on various factors such as, for example, the mass shape and weight distribution, and the stiffness of the compliant portion of the elastic member. The following provides a dynamics model of an embodiment of the haptic device having a unidirectional mode and a harmonic mode.

Equation 1 below is based on a second order Laplace transform function, and can be used to model the harmonic mode of a haptic device, such as the haptic devices discussed above, for example, which are capable of using a rotating mass.

$$\frac{X}{T_m} = \frac{1}{r(ms^2 + bs + k)} \tag{1}$$

In Equation 1 above, X is displacement of the mass of a haptic device, $T_m$ is the torque of an actuator driving the haptic device (e.g., a motor), m is the weight of the mass, r is the eccentricity radius, k is the spring constant, b is the damping constant, and s is the Laplace variable. The eccentricity radius r is the distance from center of an actuator shaft to "center of mass" of the mass being driven by the actuator of the haptic device.

Equation 2, shown below, can be used to model the unidirectional mode of a haptic device, such as the haptic devices discussed above, for example, which are capable of using a rotating mass.

$$F=r\omega^2 m \qquad (2)$$

In Equation 2 above, F is the force, ω is the angular velocity of the mass of the haptic device (e.g., 2πf, where f is the frequency of the mass of the haptic device).

Equation 3 below shows a damping ratio d that can be used to model damping of a haptic device, such as the haptic devices discussed above, for example, which are capable of using a rotating mass.

$$d = \frac{b}{2\sqrt{k}} \qquad (3)$$

In Equation 3 above, d is the damping ratio that relates the damping constant b to the spring constant k.

The dynamics model defined above in connection with Equations 1-3 can be used to design a haptic device having a harmonic mode. For example, the specific values of the damping ratio d, the spring constant k, the weight of the mass m, and the eccentricity radius r can be selected to achieve a particular behavior of a haptic device. Ways in which the dynamics model, defined above using Equations 1-3 can be used to achieve a particular behavior of a haptic device is described in greater detail in U.S. application Ser. No. 10/301, 809, filed on Nov. 22, 2002, entitled, "Haptic Feedback Using Rotary Harmonic Moving Mass," incorporated by reference above.

As described above, a multi-mode haptic device is capable of providing effects using both a unidirectional operational mode and a harmonic operational mode. According to one or more embodiments of the invention, the unidirectional operational mode provides strong, attention-getting signals y, and the harmonic operational mode, on the other hand, is used to convey subtler sensations than those generally associated with the unidirectional operational mode. In addition to a DC signal, one or more embodiments of the invention can use a low frequency AC signal can drive a haptic device in the unidirectional operational mode because it has non-zero values for sufficiently long periods of time.

Figure 8:
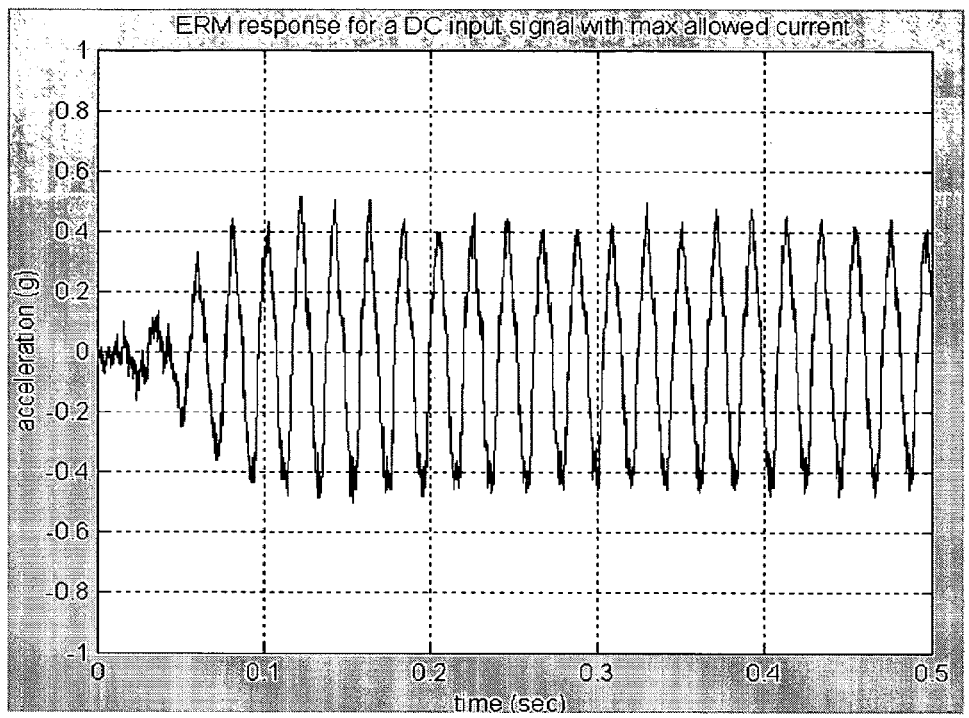
FIG. 8 is a plot showing an acceleration-versus-time response of a haptic device, according to an embodiment of the invention.

FIG. 8 is a plot showing an acceleration-versus-time response of a haptic device, according to an embodiment of the invention. The response shown in FIG. 8 is a low-frequency rumble response obtained by applying a DC drive signal to the haptic device. Or, in other words, the response shown in FIG. 8 is the response of a haptic device being driven in a unidirectional operational mode.

Figure 9:
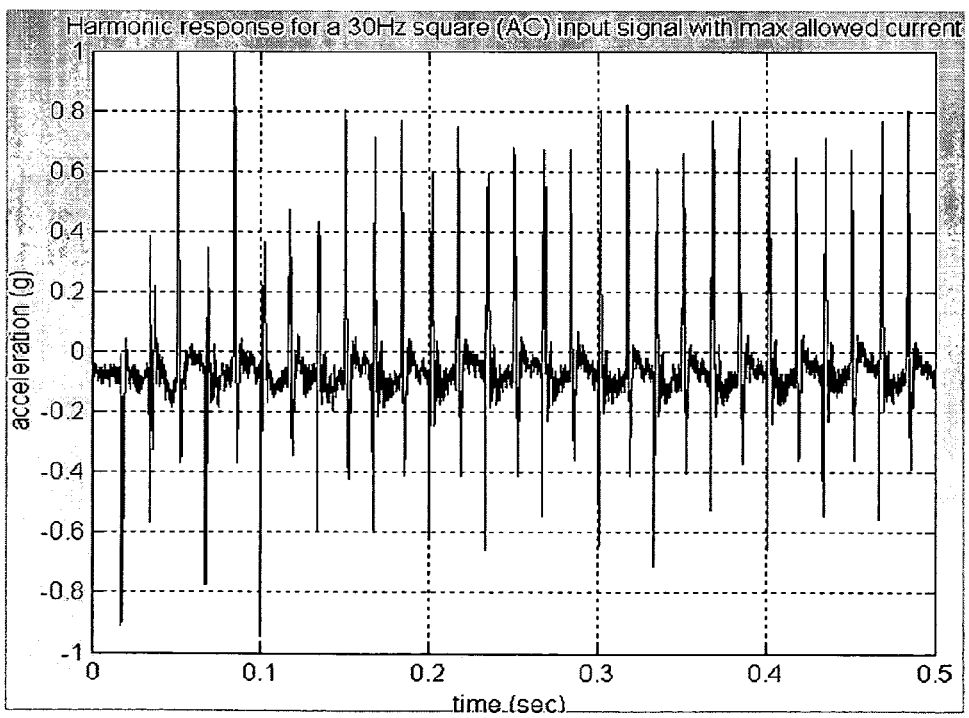
FIG. 9 is a plot showing an acceleration-versus-time response of a haptic device, according to an embodiment of the invention.

FIG. 9 is a plot showing an acceleration-versus-time response of a haptic device, according to an embodiment of the invention. The response shown in FIG. 9 is obtained by applying an AC drive signal in the form of a periodic square wave having a frequency of approximately 30 Hz. The magnitude and frequency of the response can be decoupled and can be independently varied as will be described in greater detail below. The response shown in FIG. 9 can, for example, result from direction reversals caused by the applied periodic square-wave or rectangular-wave signal. According to one or more embodiments of the invention, any physical compliance of the haptic device can cause a recoil, which can contribute to the response shown in FIG. 9, increasing the size of the acceleration peaks. As discussed above, for rotating masses in an asymmetric device, the compliance may change the moment of the device depending upon the direction the device is rotated.

Figure 10:
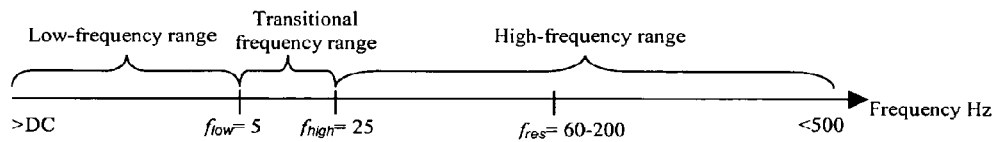
FIG. 10 is a plot showing drive-signal frequency ranges of a multi-mode haptic device, according to an embodiment of the invention.

FIG. 10 is a plot showing an example of drive-signal frequency ranges of a multi-mode haptic device, according to an embodiment of the invention. More specifically, the frequency ranges shown in FIG. 10 are ranges of drive-signal frequencies used to drive a bi-modal haptic device having a first mode that corresponds to the low-frequency range and a second mode that corresponds to a high-frequency range. The principles shown in the plot of FIG. 10 can be generalized, however, to multi-modal haptic devices having more that two modes, which would have similar, multiple frequency ranges corresponding to each of the device's multiple modes, and a transitional frequency range between each of those multiple frequency ranges.

In the example shown in FIG. 10, a low-frequency response is caused by drive signals within the low-frequency range, which can extend, for example, from approximately DC (i.e., 0 Hz) to a low-frequency limit $f_{low}$ of approximately 5 Hz. A transitional frequency response is caused by drive signals within the transitional-frequency range, which can extend, for example, from the low-frequency limit $f_{low}$ to a high-frequency limit $f_{high}$ of approximately 25 Hz. A high-frequency response is caused by drive signals within the high-frequency range, which can extend, for example, from the high-frequency limit $f_{high}$ to all higher frequencies (e.g., all frequencies capable of being output by the device). A resonant-frequency $f_{res}$ response, which depends upon the physical characteristics of the haptic device, is achieved by a drive signal having a frequency located in this example within the high-frequency range. For example, the resonant-frequency $f_{res}$ response can be achieved by using drive signals having frequencies between about 60 Hz-200 Hz. The drive signals used to achieve this resonant-frequency $f_{res}$ response can vary according to design constraints and desired performance of the haptic device.

The high end of the unidirectional operational mode of the device is dependent upon characteristics of the actuator used. Thus, the exact frequency where the haptic device ceases to operate in the unidirectional operational mode and begins to operate in the harmonic operational mode can vary from device to device. Accordingly, the transitional frequency range is designed to include frequencies of drive signals at which most actuators transition from operating in a unidirectional operational mode, to operating in a harmonic mode. Thus, the low-frequency range shown in FIG. 10 includes frequencies of drive signals that can cause some haptic devices to operate in the unidirectional operational mode, and the high-frequency range includes frequencies of drive signals that can cause these haptic devices to operate in the harmonic operational mode. Drive signals with frequencies located within the transitional frequency range can be used to provide smooth transitions from a low-frequency, unidirectional operational mode to a high-frequency, harmonic operational mode.

FIGS. 11A-11G are plots showing examples of signals used to drive a haptic device, according to an embodiment of the invention. The signals shown in FIGS. 11A-11G are low-frequency signals used to drive a haptic device within the low-frequency range shown in FIG. 10. These signals are used to convey a strong sensation and a clear beat pattern of the output feedback (i.e., the periodicity of the output feedback) to a user of an interface device, such as the interface device 20 shown in FIG. 1. The signals shown in FIGS. 11A-11G have a period T defined by the relation shown in Equation 4 below.

$$T = \frac{1}{f_{desired}} \quad (4)$$

In Equation 4 above, the desired frequency $f_{desired}$ can be selected based upon the desired performance of the haptic device to which the drive signal is being applied.

According to one or more embodiments of the invention, the desired frequency $f_{desired}$ of the drive signal is equal to the resonant frequency $f_{res}$ of the haptic device to which the signal is being applied. When the resonant frequency $f_{res}$ is used to drive an actuator (e.g., by applying the resonant frequency $f_{res}$ directly, or by applying bursts of the resonant frequency $f_{res}$), acceleration of the mass is maximized, and a low frequency response is emulated. The frequency of a signal, such as a square wave, can be varied to change a user's perception of a frequency of a haptic effect. The duty cycle can be varied to change a user's perception of a magnitude of a haptic effect.

Figure 11:
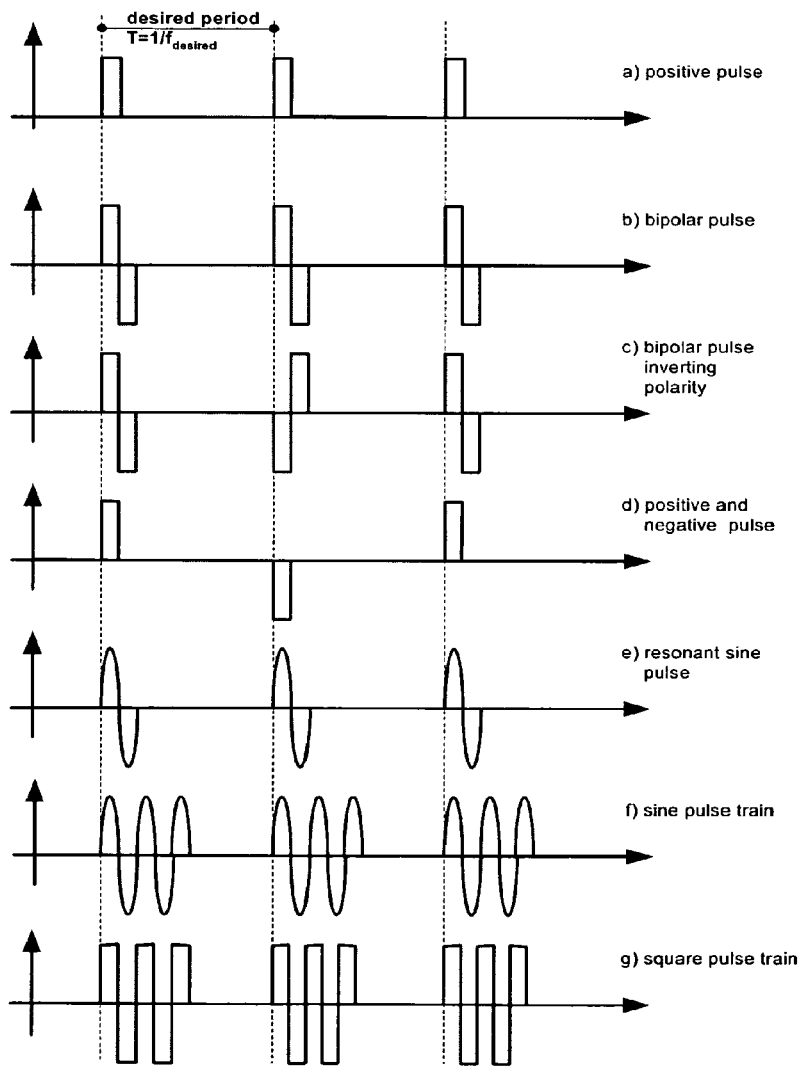
FIGS. 11A-11G are plots showing examples of signals used to drive a haptic device, according to an embodiment of the invention.

FIGS. 11A-11D are forms of rectangular waves. FIG. 11A is a positive pulse; FIG. 11B is a bipolar pulse; FIG. 11C is a bipolar pulse with inverting polarity; and FIG. 11D is a positive and negative pulse. FIG. 11E is a resonant sine pulse and FIG. 11F is a sine pulse train. FIG. 11G is a square pulse train.

In accordance with one or more embodiments of the invention, various duty-cycle-driven control methods for controlling a multi-mode haptic device can be used to determine drive frequencies appropriate for emulating low-frequency haptic feedback responses. Such a duty-cycle-driven control method that can be used in accordance with one or more embodiments of the invention is described in U.S. application Ser. No. 09/669,029, filed on Sep. 27, 2000, entitled, "Controlling Haptic Sensations for Vibrotactile Feedback," and Ser. No. 09/675,995, filed on September 29, now U.S. Pat. No. 6,680,729, entitled, "Increasing Force Transmissiblity for Tactile Feedback Interface Devices," the disclosures of which are incorporated by reference.

According to an embodiment of the invention, a duty-cycle-driven control method can be used to divide a frequency range of a haptic device into two portions: a low-frequency range and a high-frequency range. The actuator of the haptic device can be driven using, for example, the maximum available current and/or voltage. According to one or more embodiments of the invention, a duty-cycle-driven control method operates in the unidirectional operational mode. The magnitude of the periodic haptic feedback is determined by varying the "on-time" of the driving signal's duty cycle.

According to another embodiment of the invention, using a duty-cycle-driven control method, low-frequency haptic feedback, which is the rumble response shown in FIG. 8, can be achieved using a drive signal that has a frequency outside the low-frequency range shown in FIG. 10. The "on-time" $t_{on}$ of the driving signal, according to this embodiment, is long enough such that the desired haptic feedback is produced. The maximum magnitude M of the haptic feedback is accomplished by a drive signal with the maximum on-time $t_{onmax}$. Other magnitudes m of the haptic feedback, which are less than the maximum magnitude M, can be achieved by using an on-time $t_{on}$ that is less than the maximum on-time $t_{onmax}$, and which is defined in the manner shown below in Equation 5.

$$t_{on} = \frac{m}{M} t_{onmax} \quad (5)$$

According to another embodiment of the invention using a duty-cycle-driven control method, high-frequency haptic feedback can be achieved using an on-time $t_{on}$, which is a percentage P of the desired period T. Thus, according to this embodiment, the maximum magnitude M for the high-frequency haptic feedback is achieved for an on-time $t_{on}$ that is 100-percent of a specific or desired period T. Other magnitudes m of the haptic feedback, which are less than the maximum magnitude M can be calculated in the manner shown below in Equation 6.

$$t_{on} = \frac{mP}{100\,M} T \quad (6)$$

Figure 12:
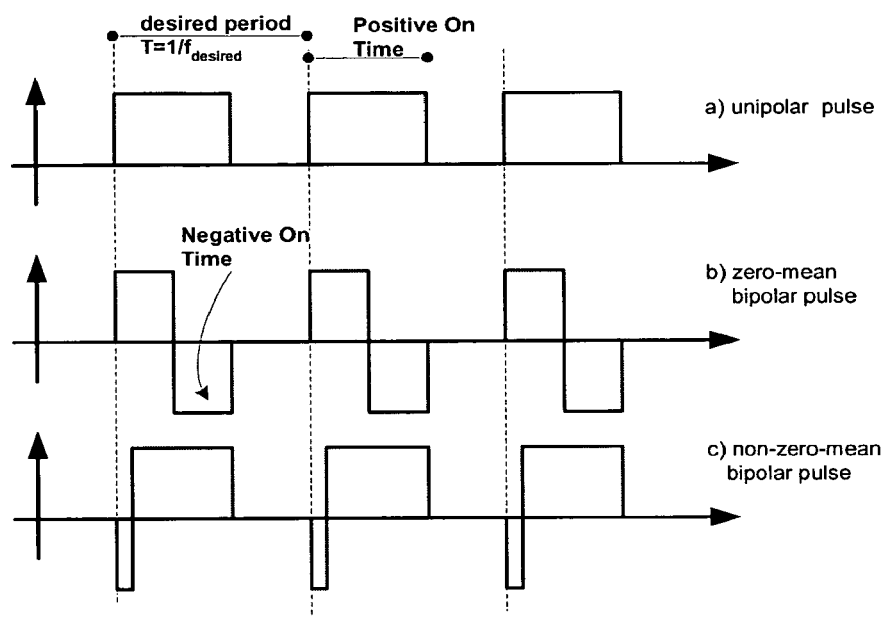
FIGS. 12A-12C are plots showing examples of signals used to drive a haptic device, according to an embodiment of the invention.
Figure 13:
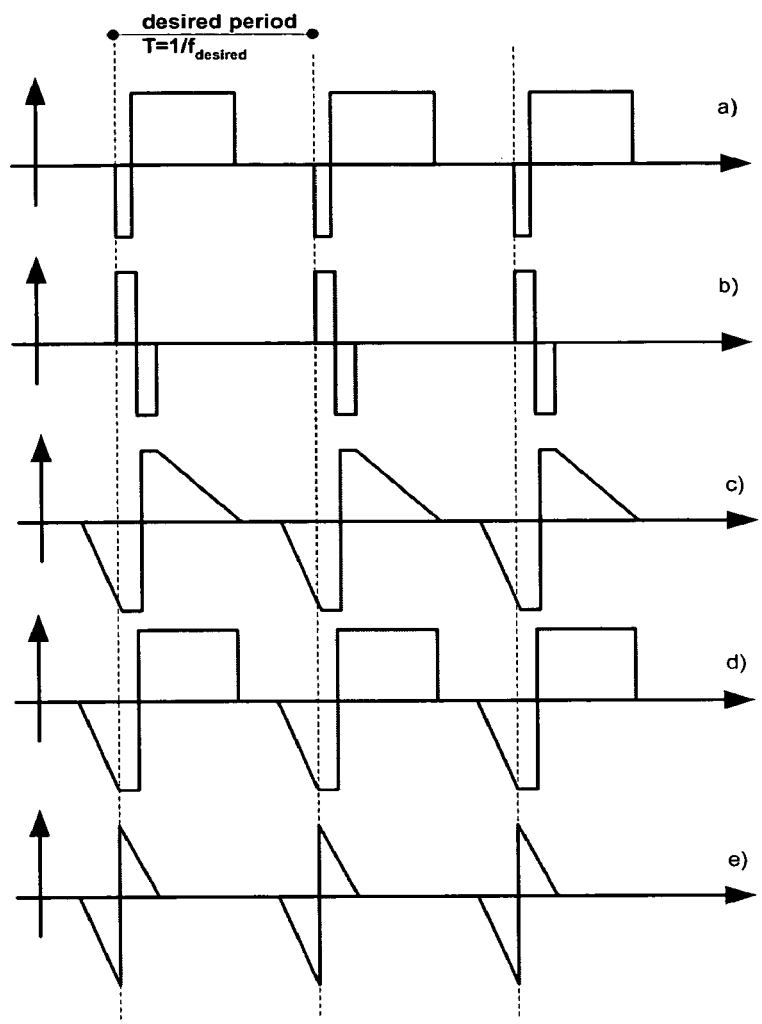
FIGS. 13A-13E are plots showing examples of signals used to drive a haptic device, according to an embodiment of the invention.

FIGS. 12A-12C are plots showing examples of signals used to drive a haptic device, according to an embodiment of the invention. The drive signals shown in FIGS. 12A-12C have frequencies of approximately 20 Hz to 30 Hz. The signal shown in FIG. 12A, for example, is an example of a unipolar pulse appropriate for operation in the unidirectional operational mode. The signal of FIG. 12B is an example of a bipolar pulse with a 50-percent duty cycle appropriate for high-frequency operation, or operation in the harmonic operational mode. The signal of FIG. 12C is an example of a bipolar pulse with a non-fifty-percent duty cycle appropriate for operation in the high-low transition area shown in FIG. 10. The small negative pulse of the signal shown in FIG. 12C can be used to stop the motion of the previous period.

According to one or more embodiments of the invention, the drive signals shown in FIGS. 12A-12C can be used to provide a substantially smooth transitional frequency range from the low-frequency range to the high-frequency range (see, e.g., the transitional frequency range from 5 Hz to 25 Hz shown in FIG. 10). As a drive signal transitions from a low-frequency signal to a high-frequency signal, the positive pulse of a bipolar signal (e.g., the non-zero-mean bipolar-pulse signal shown in FIG. 12C) is reduced gradually until it becomes a zero-mean bipolar-pulse signal (e.g., as shown in FIG. 12B) causing a haptic device to operate in the high-frequency range.

Because the magnitude of the step size from the negative part of the signal to the positive part of the signal in FIGS. 12B and 12C is larger than change from zero to the positive part of the signal, it creates a larger perceived haptic effect magnitude. Power is better conserved, however, by not having a negative on-time, as in FIG. 12A. Thus, where power conservation is more important, the drive signal using a unipolar pulse (e.g., the drive signal shown in FIG. 12A) can be used, and where a larger haptic magnitude is required, a bipolar pulse (e.g., the drive signals shown in FIGS. 12B and 12C) can be used.

FIGS. 13A-13E are plots showing examples of signals used to drive a haptic device, according to another embodiment of the invention. Generally speaking, the signals shown in FIGS. 13B, 13C, and 13E create a beat pattern easily identifiable by a user because the transients of the signal are perceived as a single pulse (e.g., a burst pulse). The signals shown in FIGS. 13A and 13D produce a larger perceived magnitude than the signals of FIGS. 13B, 13C, and 13E, but do not produce a beat pattern as clear as the signals of those Figures in part because of transients associated with those signals. Thus, as demonstrated by the perceived haptic feedback caused by the drive signals of FIGS. 13A-13E, there is a trade-off between perceived strength and perceived beat pattern.

Drive signals providing haptic feedback within the transitional frequency range (see, e.g., FIG. 10) are dependent on the profiles chosen in both the low-frequency and high-frequency ranges of a haptic device. Specifically, to provide a substantially smooth transition between frequency ranges and consistency of magnitudes over an extended frequency spectrum, the proper drive signals within the low-high transition range can be selected, such that the perceived haptic effect in this area appears to be "blended."

Figure 14:
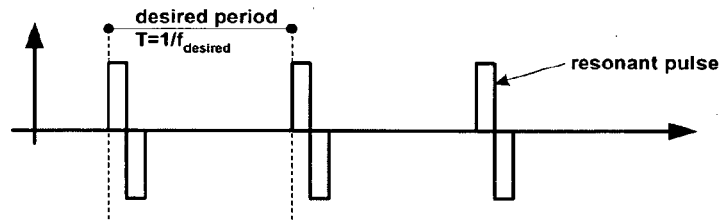
FIG. 14 is a plot showing an example of a signal used to drive a haptic device, according to an embodiment of the invention.

One technique of combining, or "blending," drive signals for a smooth response transition within the transitional frequency range, according to an embodiment of the invention, is to use a resonant pulse, while varying the desired frequency. The signal shown in FIG. 14 is a series of resonant pulses that can be used to generate drive signals having frequencies over the entire functioning frequency range of a haptic device, according to an embodiment of the invention. Drive signals in the low-frequency range can use pulses at a resonant frequency $f_{res}$ spaced at periods T determined by substituting the resonant frequency $f_{res}$ for the desired frequency $f_{desired}$ in Equation 4. This provides a consistent perceived magnitude and frequency pattern over the whole functioning frequency range.

Another technique of blending drive signals for a smooth response transition within the transitional frequency range, according to a embodiment of the invention, is to use a resonant pulse converted to a zero-mean bipolar-pulse periodic signal. Such a signal can be used to provide haptic feedback within the transitional frequency range. The transition drive signal having a zero-mean bipolar-pulse can be derived using a magnitude conversion, a frequency conversion, or duty-cycle-driven control method, among other techniques.

Figure 15:
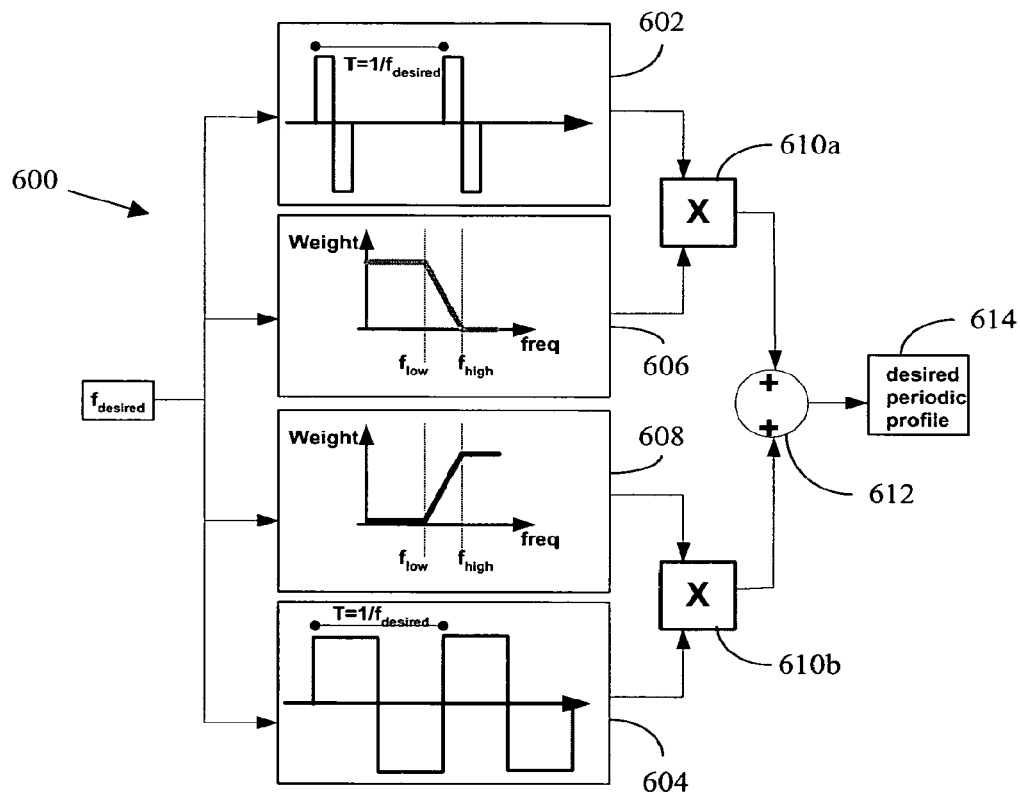
FIG. 15 is a diagram illustrating elements of an embodiment of the invention.

FIG. 15 shows a system 600 for performing magnitude conversion of drive signals according to an embodiment of the invention. A resonant pulse drive signal generator 602 and a bipolar-pulse drive signal generator 604 (e.g., a fifty-percent duty-cycle drive signal generator) produce respective signals computed for the period T in the manner shown in Equation 4. The drive signal produced by each drive signal generator 602, 604 is with a corresponding pre-determined weighting filter 606, 608, by a corresponding multiplier 610a, 610b in the frequency domain. The resulting products are summed by a summer 612 to produce a desired periodic profile 614 for the desired $f_{desired}$.

In other words, the resonant pulse generated by the resonant pulse generator 602 is multiplied in the frequency domain by a first weighting filter 606, which is essentially a low-pass filter. The bipolar-pulse drive signal generated by the bipolar-pulse drive signal generator 604 is multiplied in the frequency domain by a second weighting filter, which is essentially a high-pass filter. Hence, in the resulting signal having the desired periodic profile 614, as can be seen in the frequency profiles of the first weighting filter 606 and the second weighting filter 608, for frequencies from zero to the low-frequency limit $f_{low}$ shown in FIG. 10, the weight of the resonant pulse is one, and the weight of the bipolar-pulse periodic drive signal is zero, respectively. Conversely, at frequencies from the high-frequency limit $f_{high}$ and above, the weight of the resonant pulse is zero and the weight of the bipolar-pulse periodic drive signal is one. In the transitional frequency range shown in FIG. 10, the resonant pulse signal and the bipolar-pulse drive signal are combined in such a manner that the weight of the resonant pulse signal decreases and the weight of the bipolar-pulse drive signal increases, with increased frequency within the transitional frequency range. The resulting desired periodic profile 614 provides a haptic feedback having a well-defined pattern that is "blended" across an extended frequency range.

Another technique for blending haptic feedback responses from the various frequency ranges shown in FIG. 10, according to another embodiment of the invention, is to perform a frequency conversion. A frequency conversion can be used to smoothly convert a low-frequency periodic drive signal that uses a resonant pulse drive signal into a high-frequency periodic signal. This technique modifies the frequency of the pulse drive signal used in the low-frequency range until the drive signal is converted to a zero-mean bipolar-pulse (e.g., a fifty-percent duty-cycle periodic signal) at the high-frequency range, similar to the manner discussed above in connection with the transitional-frequency-range drive signal shown in FIG. 12C.

Equations 7, 8, and 9 refer to an embodiment where the frequency of the pulse $f_{pulse}$ generates haptic feedback that provides a user with a perception of a periodic signal at a desired frequency $f_{desired}$ with a particular magnitude m within the frequencies of the transitional frequency range shown in FIG. 10.

$$m = \frac{f_{res} - f_{high}}{f_{low} - f_{high}} \quad (7)$$

$$b = f_{res} - m \cdot f_{low} \quad (8)$$

$$f_{pulse} = m \cdot f_{desired} + b \quad (9)$$

In Equations 7, 8, and 9 above, m is the perceived magnitude of the haptic feedback, $f_{low}$ is the low-frequency limit, $f_{high}$ is the high-frequency limit, $f_{res}$ is the resonant frequency of the haptic device, and b is the damping constant.

Using Equations 7, 8, and 9 above, the pulse frequency $f_{pulse}$ required to provide a desired frequency $f_{desired}$ haptic output to a user can be readily determined. For example, if a haptic device has a resonant frequency $f_{res}$ of 200 Hz, and the low-frequency limit $f_{low}$ is 5 Hz and the high-frequency limit $f_{high}$ is 25 Hz, the pulse frequencies $f_{pulse}$ required to achieve the perception of the corresponding desired frequencies $f_{desired}$ are shown in Table 1 below.

TABLE 1

| Desired frequency $f_{desired}$ | Pulse frequency $f_{pulse}$ |
|---|---|
| 5 | 200 |
| 7 | 182.5 |
| 10 | 156.25 |
| 12 | 138.75 |
| 15 | 112.5 |
| 17 | 95 |
| 20 | 68.75 |
| 22 | 51.25 |
| 25 | 25 |

Using a frequency conversion technique, such as the technique described above, the perceived periodicity of haptic feedback experienced by a user is constant over all frequencies, including those within the transitional frequency range. More specifically, such a frequency conversion technique provides smooth "blending" of or transitioning between effects in the unidirectional operational mode associated with the low-frequency range and the harmonic operational mode associated with the high-frequency range. Additionally, using this frequency conversion technique, the magnitude of the pulse, which can be determined according to Equation 7, is preserved throughout the transition area, thereby providing haptic feedback having a consistent perceived magnitude to a user.

A duty-cycle-driven control method can also be used to convert low-frequency signals to a zero-mean bipolar-pulse (e.g., a fifty-percent duty-cycle periodic signal) at the high-frequency range, according to another embodiment of the invention. Such duty-cycle-driven control method can be used, for example, with drive signals, such as the drive signal shown in FIG. 12C. The duty-cycle-driven control method can be used to determine on-time $t_{on}$ in the same manner determined in both the low-frequency range and the high-frequency range, as explained above in connection with Equations 5 and 6, for example. As described above, the negative signal values serve as a brake pulse, or in other words, stops the motion associated with the previous pulse. Additionally, as described above, the negative on-time creates a large transition between positive and negative acceleration (i.e., between the positive portion of the signal and the negative portion of the signal), which results in a higher acceleration profile and a higher perceived force magnitude. The duty-cycle-driven control method achieves relatively effective periodicity, and increases the strength of the perceived haptic feedback. The duty-cycle-driven control method also provides a smooth perceived transition between all three frequency ranges shown in FIG. 10.

According to one or more embodiments of the invention, periodic haptic responses in the high-frequency range can be created using one of two techniques. For example, according to an embodiment of the invention, a high-frequency periodic response can be created using a zero-mean bipolar-pulse drive signal, as shown in FIG. 12B. According to another embodiment of the invention, a high-frequency periodic response can be created using a single resonant pulse every period, as shown in FIGS. 11A and 11B, for example. Around the resonant frequency $f_{res}$, the two techniques produce similar periods and magnitudes. Below the resonant frequency $f_{res}$, however, the zero-mean bipolar-pulse drive signal technique generally produces a perceived higher haptic feedback magnitude.

According to one or more embodiments of the invention, three distinct drive signals can be provided for haptic responses within each of the three frequency ranges shown in FIG. 10. For haptic feedback within the low-frequency range, a rectangular-wave signal can be provided. For haptic feedback within the transitional frequency range, an duty-cycle-driven control method can be used to determine the appropriate drive signal to be applied. For haptic feedback within the high-frequency range, a zero-mean bipolar-pulse drive signal can be used.

Figure 16:
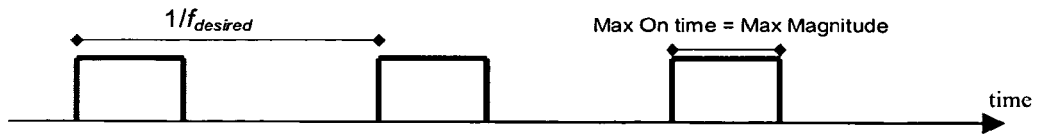
FIG. 16 is a plot showing an example of a signal used to drive a haptic device, according to an embodiment of the invention.

FIG. 16 is a plot showing an example of a signal used to drive a haptic device, according to an embodiment of the invention. The rectangular-wave signal shown in FIG. 16 is used to provide haptic responses within the low-frequency range shown in FIG. 10. The period T of the signal is determined by using the desired output frequency $f_{desired}$, as shown in Equation 4 above. The on-time $t_{on}$ can be calculated using Equations 5 and 6 above. As explained above in connection with those equations, the maximum on-time $t_{onmax}$ corresponds to the maximum magnitude M of the haptic feedback perceived by the user. For such an embodiment, for example, the maximum on-time $t_{onmax}$ is about two or three periods of the drive signal (e.g., two or three rotations of a rotating mass of a haptic device). According to an embodiment of the invention, the maximum on-time $t_{onmax}$ is approximately 80 milliseconds. This time can vary greatly, however, as it is dependent of the devices used, such as the actuator, mass, and other parameters. The maximum on-time $t_{onmax}$ can be a parameter stored in memory (e.g., in firmware or software, etc.) such that an interface device 20 can make use of a variety of haptic devices 24, each of which can have a different set of parameters including a maximum on-time $t_{onmax}$.

According to another embodiment of the invention, a drive signal supplied within the low-frequency range makes use of only unipolar pulses (i.e., positive-only or negative-only pulses), such as the unipolar pulse signal shown in FIG. 16, for example, to conserve energy, making the haptic device more power efficient. According to yet another embodiment of the invention, however, bipolar pulses (i.e., pulses having both negative and positive components) can be used to provide a response having a better defined periodicity because a negative pulse has the effect of stopping an effect from a previous positive pulse and vice versa.

Figure 17:
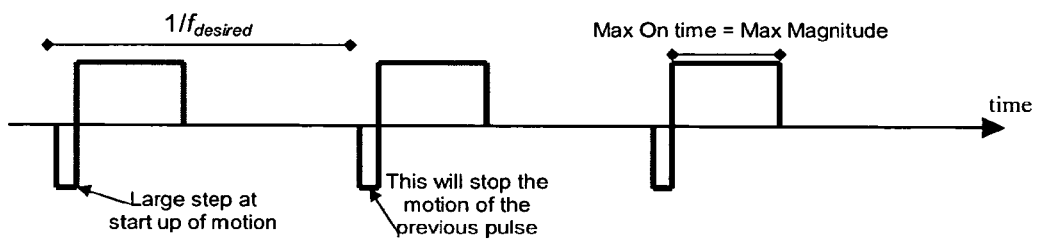
FIG. 17 is a plot showing an example of a signal used to drive a haptic device, according to an embodiment of the invention.

FIG. 17 is a plot showing an example of a signal used to drive a haptic device, according to an embodiment of the invention. The drive signal shown in FIG. 17 is used to provide haptic sensations within the transitional frequency range, and is calculated using a duty-cycle-driven control method, such as the ones described above in connection with Equations 5 and 6. The drive signal in FIG. 17 is bi-directional, which provides a large transition from the negative portions of the signal to the positive portions of the signal. This bi-directional nature of the drive signal produces a larger perceived magnitude of the haptic effect generated. The bi-directional nature of the drive signal shown in FIG. 17 also stops motion generated from a previous pulse (i.e., it has a "braking" effect).

The period T of the drive signal shown in FIG. 17 is calculated as described above in connection with Equation 4, using the desired frequency $f_{desired}$. As explained above in connection with Equations 4, 5, and 6, the maximum on-time $t_{onmax}$ corresponds to the maximum magnitude M of the haptic feedback generated. In one embodiment, the short negative pulse preceding each positive on-time $t_{on}$ is relatively short compared to the positive on-time $t_{on}$, and has the effect of stopping the motion associated with the previous on-time $t_{on}$, but is not perceived by a user (except as a transient artifact of the feedback). For example, the duration of the negative pulse can be approximately 10 ms.

The duty cycle of the drive signal can steadily increase as the haptic feedback transitions from the transitional frequency range to the high-frequency range shown in FIG. 10. A drive signal having a duty cycle of fifty percent can used in the high-frequency range shown in FIG. 10, such as the drive signal shown in FIG. 12B, for example.

Rectangular-wave drive signals (including, e.g., square-wave drive signals), such as those described above, are frequently used to convey a strong periodic haptic sensation to a user. These types of sensations conveyed by the rectangular-wave drive signals are sometimes referred to as "square-like" sensations. These square-like sensations, however, are not the only type of sensations desired for haptic feedback. For example, when a haptic device is being driven in the harmonic operational mode, or within the high-frequency range, it may be advantageous to use other drive signal forms because the high-frequency components of such drive signals can be felt and distinguished by users of a haptic device. Some examples of drive signal shapes that can be used to drive a haptic device in harmonic operational mode to produce different haptic sensations than those experienced with a square-wave drive signal including, for example, a saw-like wave, a sinusoid, or the like.

Figure 18:
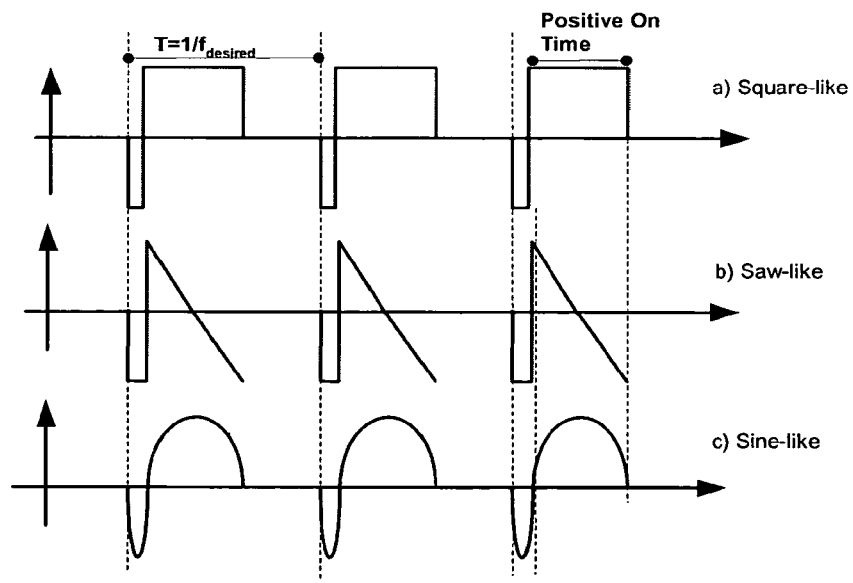
FIGS. 18A-18C are plots showing examples of signals used to drive a haptic device, according to an embodiment of the invention.

FIGS. 18A-18C are plots showing examples of signals used to drive a haptic device, according to one or more embodiments of the invention. The drive signal shown in FIG. 18A is a square wave similar to the transitional frequency range drive signal shown in FIGS. 17 and 12C. The drive signals shown in FIGS. 18B and 18C are saw-like and sinusoidal waves, respectively. All of the drive signals shown in FIGS. 18A-18C are configured with varying duty cycles using similar techniques to those described above in connection with FIGS. 17 and 12C with similar effects. Specifically, the drive signals shown in FIGS. 18A-18C have a short negative pulse prior to the on-time of each drive signal. This short pulse accomplishes a large initial transition, perceived by a user as a larger magnitude of the haptic feedback, and helps stop or slow down motion of a haptic device from the prior on-time signal (i.e., performs a "braking" function).

In addition to shaping drive signals used to drive haptic devices capable of providing multiple operational modes (e.g., unidirectional, harmonic, etc.), other techniques of controlling haptic devices are possible. For example, whether a haptic device is acting in a unidirectional or harmonic operational mode, a fast response time that exhibits no perceived lag to a user may be desired. Force applied to a haptic device (e.g., by way of an applied voltage signal), however, sometimes results in a start-up lag that may be detectable by a user. Such start-up lags can detract from the user's haptic experience for some applications.

The force F applied to a haptic device, such as the haptic device 24 shown in FIG. 1, by a haptic device having rotating mass (e.g., a haptic device having an eccentric rotating mass operating in a unidirectional operational mode or a haptic device having a harmonic eccentric rotating mass operating in a unidirectional operational mode) is directly proportional to the square of the angular velocity w. This force F can be calculated as shown below in Equation 10.

$$F = \epsilon_r \cdot \omega^2 \quad (10)$$

In Equation 10 above, $\epsilon_r$ is dependent on the size and shape of the rotating mass (i.e., it is dependent on the moment of inertia of the mass). This force F can only be detected by a user above a certain threshold of angular velocity ω. Thus, delays in ramping up the angular velocity ω of the rotating mass result in a delay of the haptic feedback felt by the user. For example, in gaming applications, where the haptic device 24 of the user device 20 uses a large rotating mass, this delay can be as long as approximately 60 ms. Such a significant delay can be felt by a user, and detracts from the haptic sensation experienced by the user. Thus, in some embodiments, decreasing the delay to synchronize the visual display of a haptic feedback triggering event with the corresponding haptic feedback is highly desirable in all operational modes, including, for example, the operational modes corresponding to the three frequency ranges shown in FIG. 10.

Figure 19A:
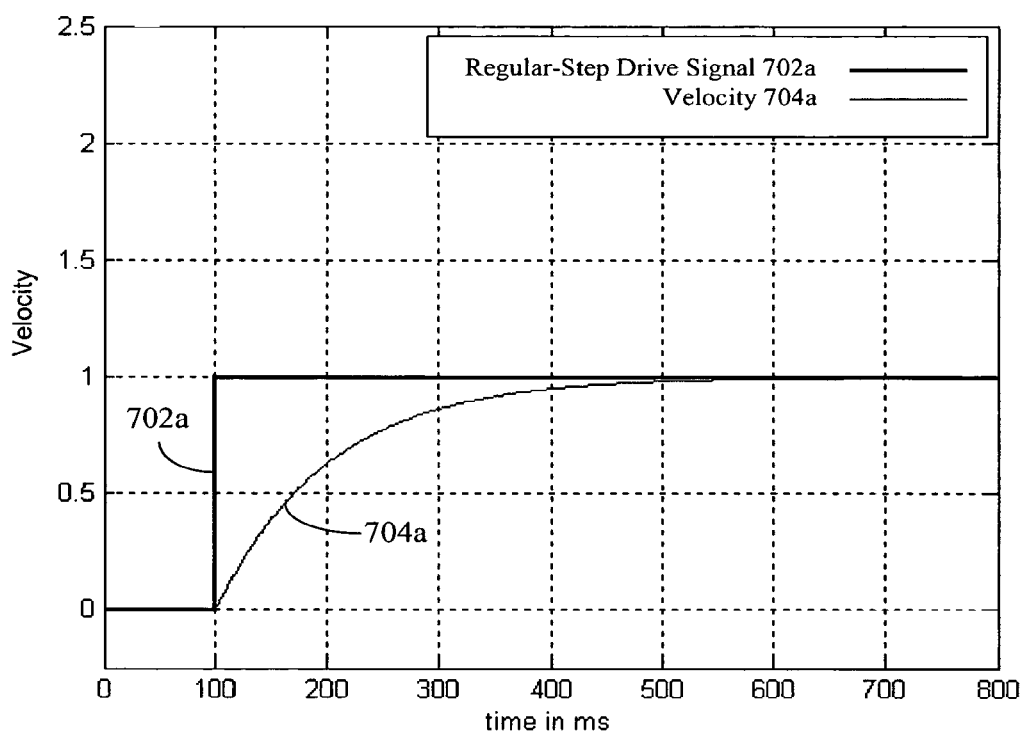
FIG. 19A is a plot showing an example of a step signal used to drive a haptic device and the corresponding response of the haptic device, according to an embodiment of the invention.

FIG. 19A is a plot showing an example of a regular-step drive signal 702a used to drive a haptic device. According to one or more embodiments of the invention, this regular-step drive signal 702a can be referred to as a steady-state signal, or a signal configured to provide steady-state power to a haptic device. Time is shown in milliseconds on the horizontal axis, and relative velocity (of the haptic device) is shown on the vertical axis (which is similarly the case for the remaining figures). The velocity 704a of the haptic device that results from the regular-step drive signal 702a is also shown on the same plot as a curve. As can be seen in FIG. 19A, a delay occurs between the initiation of the regular-step drive signal 702a and the achievement of full velocity 704a (i.e., the steady-state velocity) of the haptic device. In some circumstances, this delay can be perceived by a user, which may be undesirable in certain applications.

Figure 19B:
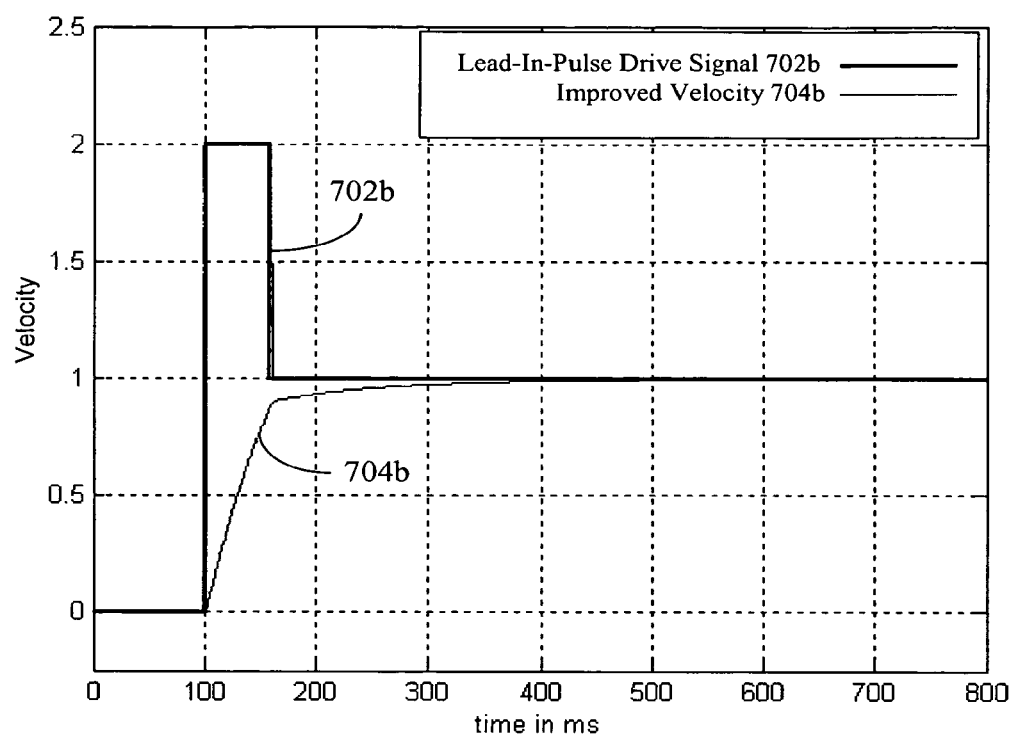
FIG. 19B is a plot showing an example of a signal used to drive a haptic device and the corresponding response of the haptic device, according to an embodiment of the invention.

FIG. 19B is a plot showing an example of a signal 702b used to drive a haptic device, according to an embodiment of the invention. The lead-in-pulse drive signal 702b shown in FIG. 19B incorporates a lead-in pulse, and can be used to provide a haptic sensation without a lag time associated with a regular-step drive signal (e.g., the regular-step drive signal 702a shown in FIG. 19A). In other words, the lead-in-pulse drive signal causes an improved velocity 704b, or reduced response time, of the haptic device as shown in FIG. 19B. The lead-in-pulse drive signal 702b begins with a pulse configured to accelerate the haptic device to full velocity quicker than the regular-step drive signal 702a shown in FIG. 19A. According to an embodiment of the invention, the lead-in pulse of the lead-in-pulse drive signal 702b can be provided by quickly discharging a capacitor when required. Such a capacitor can be trickle charged, for example, so that it is capable of providing the lead-in pulse when it is required.

In addition to delays associated with initiating tactile forces (e.g., haptic feedback), delays also sometimes exist during termination of such tactile forces (e.g., haptic feedback). For example, because of momentum gained by a rotating mass or other haptic device, termination of a drive signal does not immediately terminate the motion of the device. This response-time lag can be detected by users, which may be undesirable in certain applications. The response-time lag is more pronounced in some applications, such as some video gaming applications that use heavier rotating masses, or other haptic devices having large moments of inertia.

Figure 20A:
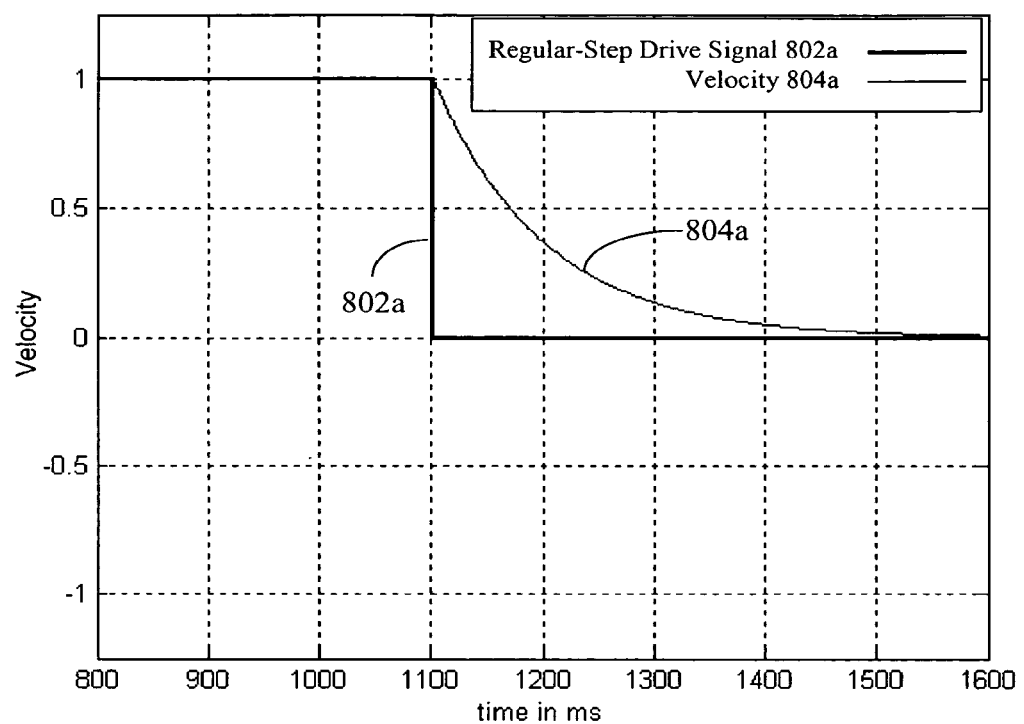
FIG. 20A is a plot showing an example of a step signal used to drive a haptic device and the corresponding response of the haptic device, according to an embodiment of the invention

FIG. 20A is a plot showing an example of a regular-step drive signal 802a used to drive a haptic device. The plot in FIG. 20A shows the regular-step drive signal 802a, ends as a step function, thereby terminating steady-state power to the haptic device. As can be seen by the resultant stopping velocity 804a shown in FIG. 20A, a delay occurs in stopping the haptic device, which can be perceived, in some circumstances, by a user. Such a delay may be undesirable in certain applications.

Figure 20B:
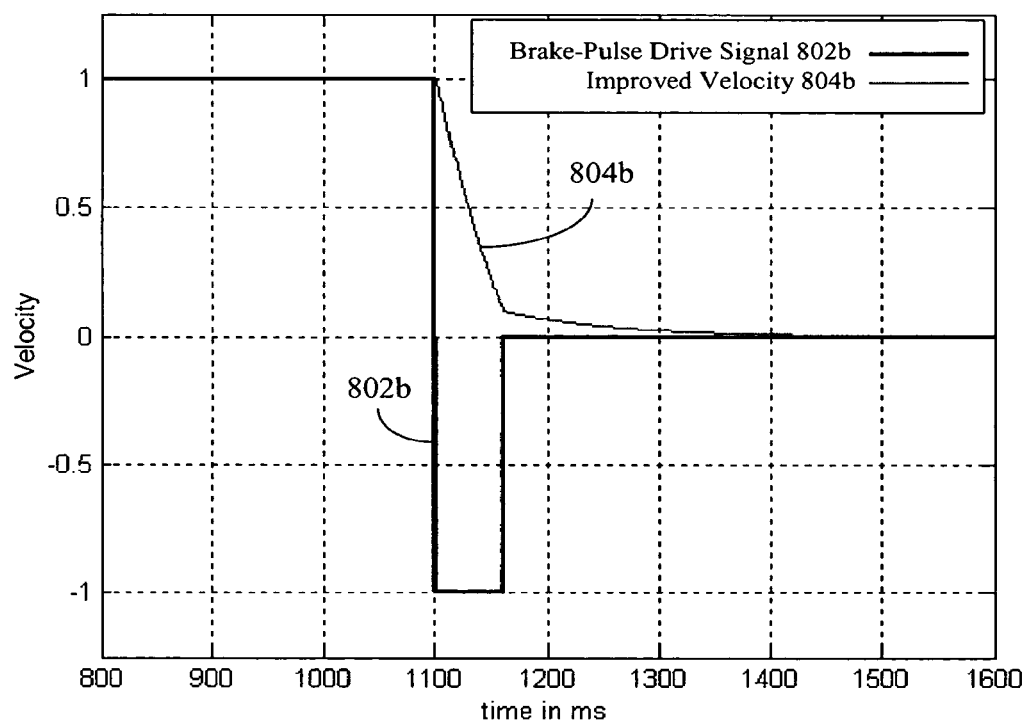
FIG. 20B is a plot showing an example of a signal used to drive a haptic device and the corresponding response of the haptic device, according to an embodiment of the invention.

FIG. 20B is a plot showing an example of a signal 802b used to drive a haptic device, according to an embodiment of the invention. The brake-pulse drive signal 802b used in FIG. 20B includes a portion having a negative pulse prior to a potion of the drive signal 802b having zero power. This negative pulse (also referred to as a brake or braking pulse) results in the improved velocity 804b shown in FIG. 20B, which has improved stopping characteristics compared to devices using a regular-step drive signal 802a (shown in FIG. 20A). Specifically, the brake-pulse drive signal 802b stops a rotating mass or other haptic device more quickly than with a regular step drive signal 802a. As with the lead-in-step drive signal 702b (shown in FIG. 19B), the brake-pulse drive signal 802b can be produced, for example, by discharging a previously charged capacitor.

Drive signals implementing the lead-in pulse and of the lead-in-pulse drive signal 702b, and the negative pulse of the brake-pulse drive signal 802b can be combined to provide haptic feedback having a reduced lag time (i.e., a reduced response time) at both the beginning and end of the feedback. The drive signals described above in connection with FIGS. 19B and 20B can be created via computer programming code that can be programmed in software, firmware, or hardware, according to the desired performance and/or design constraints of the system.

The effects described above in connection with FIGS. 19B and 20B can be implemented in any of the operational modes (e.g., unidirectional, harmonic, transitional, etc.) associated with the invention. Additionally, these effects can be implemented within all of the frequency ranges shown in FIG. 10 to provide quicker response within each of these ranges.

From the foregoing, it can be seen that systems and methods for controlling multi-mode haptic devices are discussed. Specific embodiments have been described above in connection with a multi-mode haptic device that has multiple operational modes (e.g., unidirectional, harmonic, etc.), and which operates within multiple frequency ranges including: a low-frequency range, a low-high transition range, and a high-frequency range. Additionally, specific embodiments have been described in the context of haptic devices using rotating masses to produce haptic feedback.

It will be appreciated, however, that embodiments of the invention can be in other specific forms without departing from the spirit or essential characteristics thereof. For example, while some embodiments have been described in the context of a multi-mode haptic device operating within three frequency ranges, a multi-mode haptic device can have multiple operational modes that span multiple frequency ranges in excess of the three discussed above. For example, such a haptic device could operate within multiple frequency ranges corresponding to multiple harmonics of the device. These multiple frequency ranges can have multiple transition frequency ranges therebetween. Additionally, other types of actuators, spring-mass systems, and feedback devices can be used to provide haptic device according to the principles of the invention disclosed above. The presently disclosed embodiments are, therefore, considered in all respects to be illustrative and not restrictive.

What is claimed is:

1. A processor-readable medium comprising code representing instructions to cause a processor to:
    send a first signal to cause power to be provided to a haptic device, the power being configured to cause the haptic device to output a haptic sensation above a pre-determined sensation threshold;
    send a second signal to cause a voltage pulse to be applied to the haptic device, the voltage pulse being configured to change the haptic sensation output by the haptic device by reducing a response time of the haptic device by a predetermined amount.

2. The processor-readable medium of claim 1, the code representing instructions to cause a processor to send the second signal to cause a voltage pulse to be applied at the beginning of the first signal.

3. The processor-readable medium of claim 1, further comprising code representing instructions to cause a processor to:
send a third signal to cause the power provided to the haptic device to be terminated, the code representing instructions to cause a processor to send the second signal being configured to cause the voltage pulse to be applied to the haptic device at the end of the third signal.

4. The processor-readable medium of claim 1, further comprising code representing instructions to cause a processor to:
    send a third signal to cause the power provided to the haptic device to be terminated, the code representing instructions to cause a processor to send the second signal being configured to cause the voltage pulse to be applied to the haptic device with a polarity opposite the polarity of the power provided to the haptic device in response to the first signal.

5. A processor-readable medium comprising code representing instructions to cause a processor to:
    send a signal to cause a lead-in voltage pulse to be applied to a haptic device, the lead-in voltage pulse configured to cause the haptic device to provide a haptic sensation above a pre-determined sensation threshold within a first predetermined period of time;
    send a signal to cause power to be provided to the haptic device to maintain the haptic sensation above the pre-determined sensation threshold during a second pre-determined period of time after the first pre-determined period of time.

6. The processor-readable medium of claim 3, further comprising code representing instructions to cause a processor to:
    send a signal to cause a stopping voltage pulse to be provided to the haptic device, the stopping voltage pulse configured to cause the haptic device to stop providing the haptic sensation within a third pre-determined period of time after the second pre-determined period of time.

7. A processor-readable medium comprising code representing instructions to cause a processor to:
    send a signal to cause power to be provided to a haptic device to maintain a haptic sensation provided by the haptic device above a pre-determined sensation threshold during a first predetermined period of time;
    send a signal to cause a stopping voltage pulse to be applied to the haptic device, the stopping voltage pulse configured to cause the haptic device to stop providing the haptic sensation within a second pre-determined period of time after the first pre-determined period of time.

8. A method, comprising:
    providing steady-state power to a haptic device, the power being configured to cause the haptic device to output a haptic sensation above a pre-determined sensation threshold;
    applying a voltage pulse to the haptic device, the voltage pulse being
    configured to change the haptic sensation output by the haptic device by a predetermined amount within a pre-determined reduced response time.

9. The method of claim 8, wherein the voltage pulse is applied to the haptic device prior to providing the steady-state power to the haptic device.

10. The method of claim 8, further comprising:
    terminating the steady-state power provided to the haptic device, the voltage pulse being applied to the haptic device after terminating the steady-state power.

11. The method of claim 8, further comprising:
    terminating the steady-state power provided to the haptic device, the voltage pulse being applied to the haptic device after terminating the power with a polarity opposite the polarity of the steady-state power provided to the haptic device.

12. A method, comprising:
    applying a lead-in voltage pulse to a haptic device, the lead-in voltage pulse configured to cause the haptic device to provide a haptic sensation above a predetermined sensation threshold within a first pre-determined period of time;
    providing power to the haptic device to maintain the haptic sensation above the pre-determined sensation threshold during a second pre-determined period of time after the first pre-determined period of time.

13. The method of claim 12, further comprising:
    providing a stopping voltage pulse to the haptic device, the stopping voltage pulse configured to cause the haptic device to stop providing the haptic sensation within a third pre-determined period of time after the second pre-determined period of time.

14. A method comprising:
providing power to a haptic device to maintain a haptic sensation provided by the haptic device above a pre-determined sensation threshold during a first predetermined period of time; and
applying a stopping voltage pulse to the haptic device, the stopping voltage pulse configured to cause the haptic device to stop providing the haptic sensation within a second pre-determined period of time after the first pre-determined period of time.

* * * * *